(12) United States Patent
Lee et al.

(10) Patent No.: US 12,170,058 B2
(45) Date of Patent: Dec. 17, 2024

(54) SIGNAL PROCESSING DEVICE TO IMPROVE CONTRAST OF A DISPLAYED IMAGE

(71) Applicant: LG ELECTRONICS INC., Seoul (KR)

(72) Inventors: Jungwook Lee, Seoul (KR); Jongmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 17/450,606

(22) Filed: Oct. 12, 2021

(65) Prior Publication Data

US 2022/0139310 A1      May 5, 2022

(30) Foreign Application Priority Data

Oct. 12, 2020   (KR) .................. 10-2020-0131016

(51) Int. Cl.
*G09G 3/3208*     (2016.01)
*G06T 7/194*      (2017.01)

(52) U.S. Cl.
CPC .......... *G09G 3/3208* (2013.01); *G06T 7/194* (2017.01); *G09G 2320/0653* (2013.01); *G09G 2320/066* (2013.01)

(58) Field of Classification Search
None
See application file for complete search history.

(56) References Cited

U.S. PATENT DOCUMENTS

| | | | | |
|---|---|---|---|---|
| 2011/0157210 A1* | 6/2011 | Kim | ............... | G09G 5/10 345/589 |
| 2015/0002559 A1* | 1/2015 | Fujine | ................ | G06T 5/009 345/690 |
| 2018/0173973 A1* | 6/2018 | Hattori | .............. | G01C 21/30 |
| 2019/0279549 A1* | 9/2019 | Shin | ................ | G09G 3/2007 |
| 2019/0313072 A1* | 10/2019 | Kim | ................ | H04N 9/68 |
| 2021/0020140 A1* | 1/2021 | Li | .................. | G09G 5/10 |
| 2021/0174754 A1* | 6/2021 | Yang | ................ | G06N 20/00 |

FOREIGN PATENT DOCUMENTS

| | | |
|---|---|---|
| KR | 1020030090861 | 12/2003 |
| KR | 100606740 | 8/2006 |
| WO | 2018119161 | 6/2018 |

OTHER PUBLICATIONS

European Patent Office Application Serial No. 21201824.6, Search Report dated Mar. 14, 2022, 14 pages.

* cited by examiner

*Primary Examiner* — Benjamin C Lee
*Assistant Examiner* — Emily J Frank
(74) *Attorney, Agent, or Firm* — LEE, HONG, DEGERMAN, KANG & WAIMEY

(57) ABSTRACT

The present disclosure relates to a signal processing device and an image display apparatus including the same. The image display apparatus includes a display, an image receiver configured to receive an input image, and a signal processing device configured to perform signal processing of the input image from the image receiver and to output image data to the display, wherein, when a luminance deviation of a first input image is greater than a luminance deviation of a second input image, the signal processing device controls a luminance adjustment change rate of a first input image to be less than a luminance adjustment change rate of the second input image. Accordingly, contrast of an image displayed on the display is improved.

15 Claims, 23 Drawing Sheets

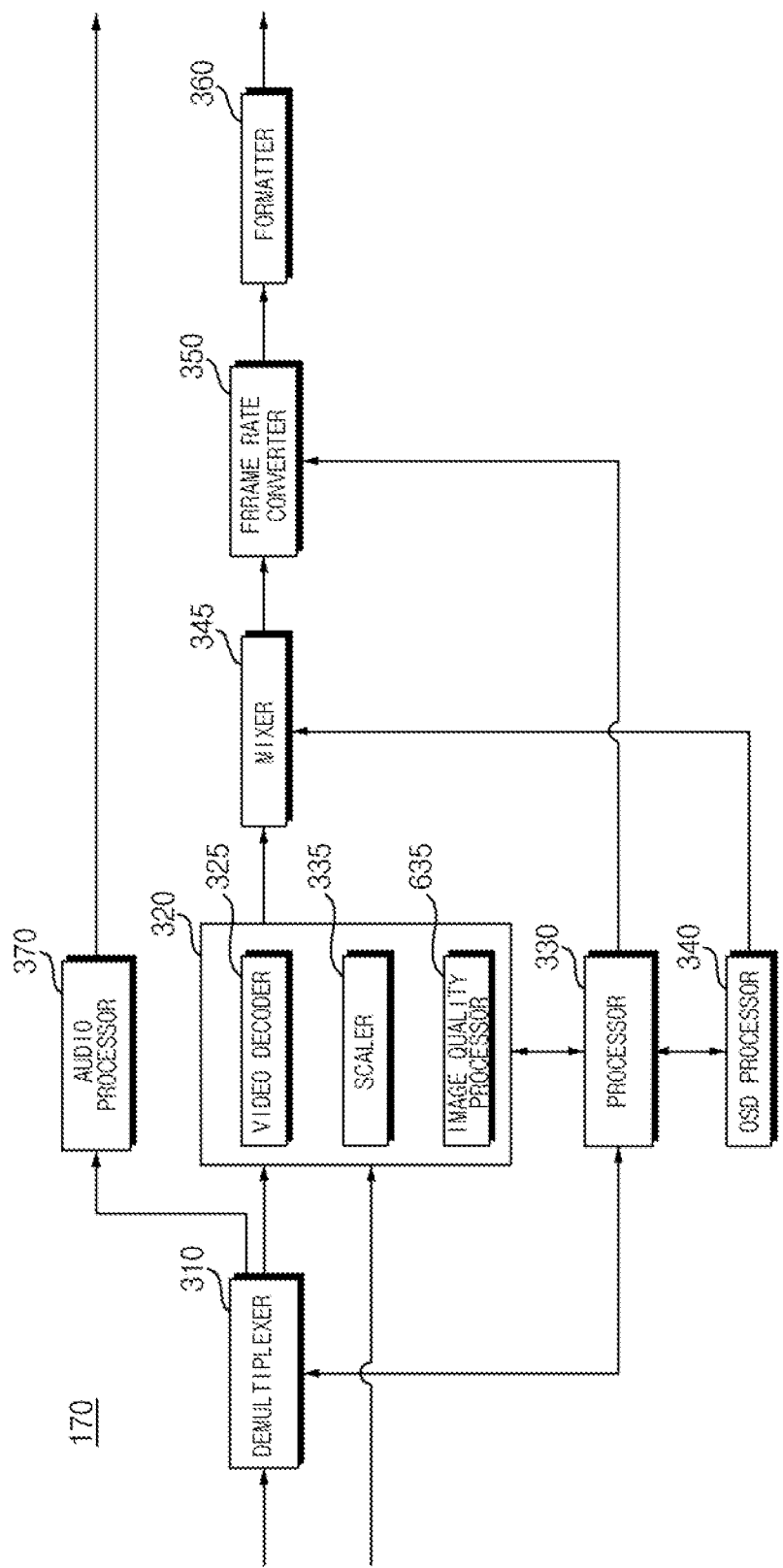

(a) (b) (c)

FIG. 8C
(a)
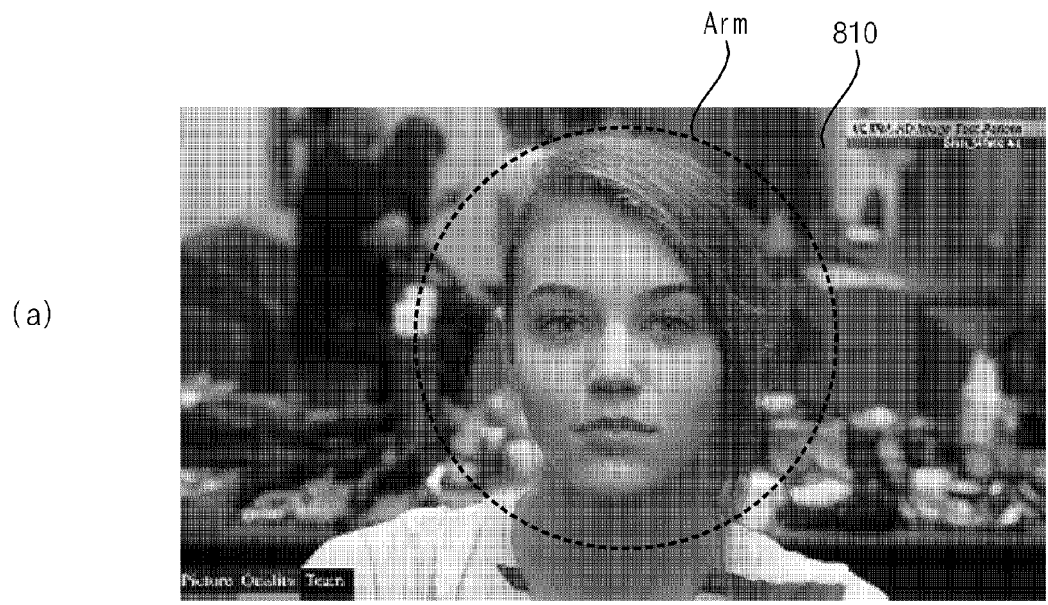
(b)
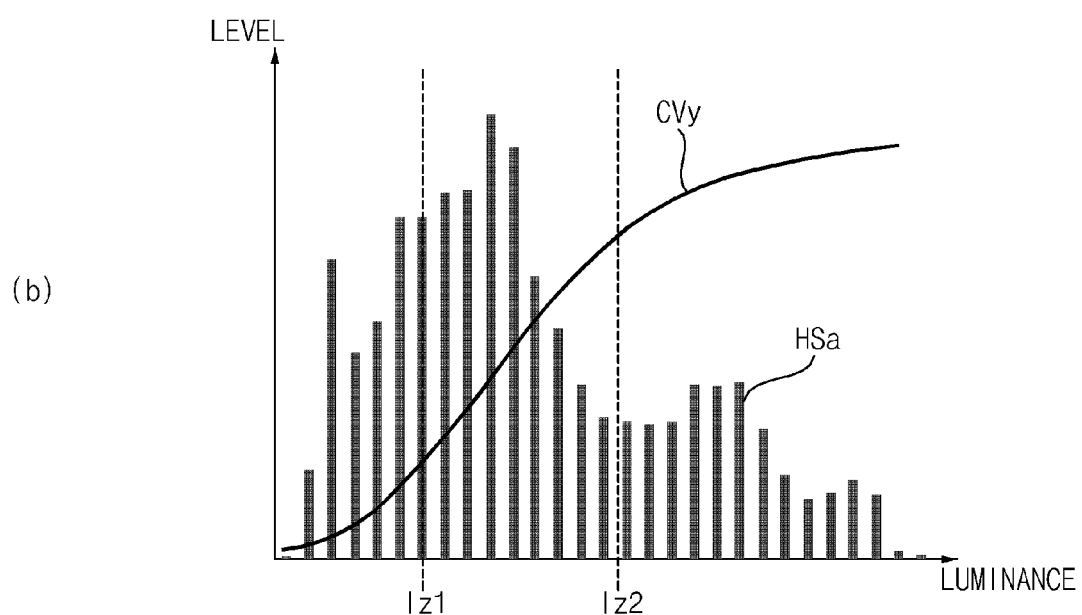

FIG. 8D
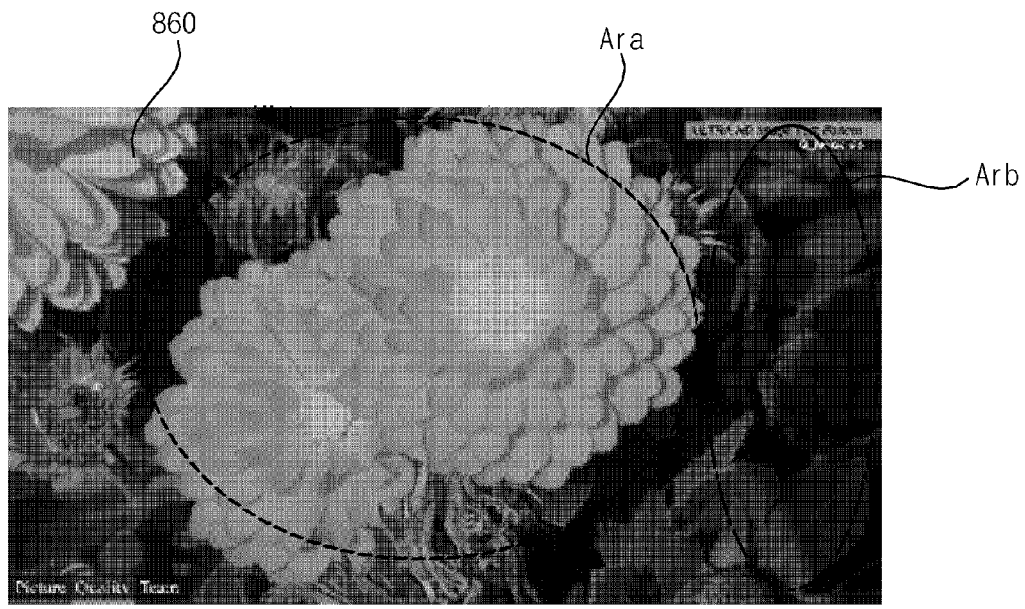
(a)
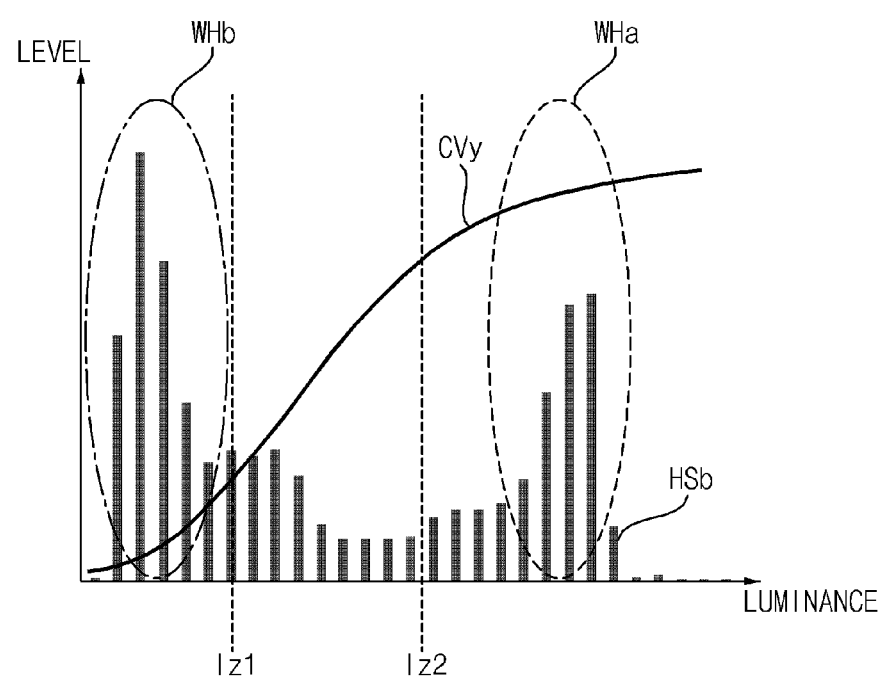
(b)

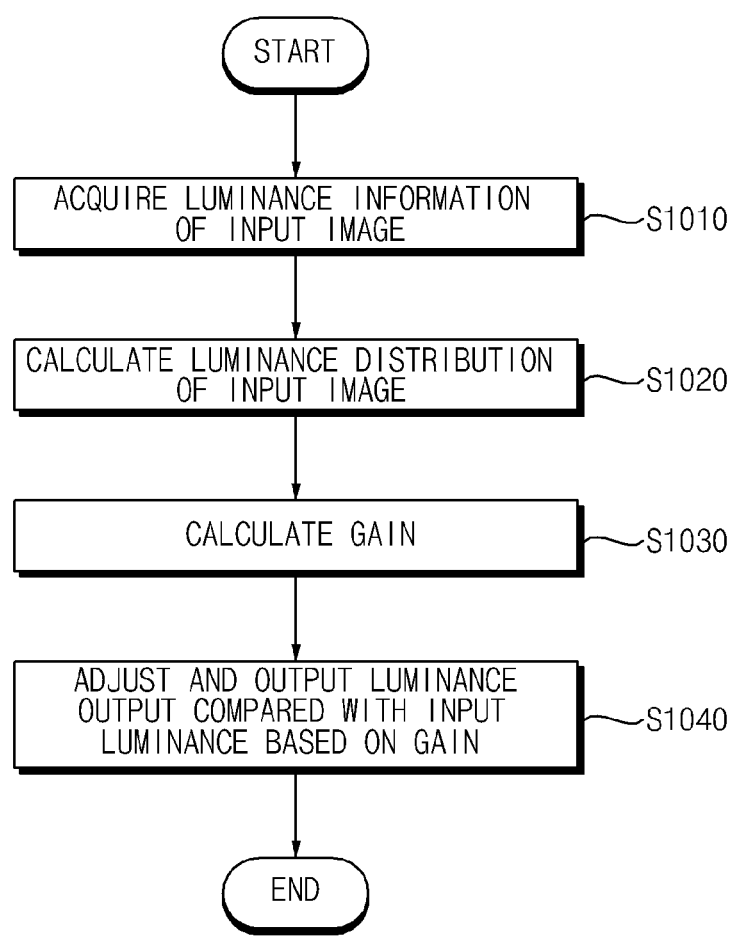

FIG. 13
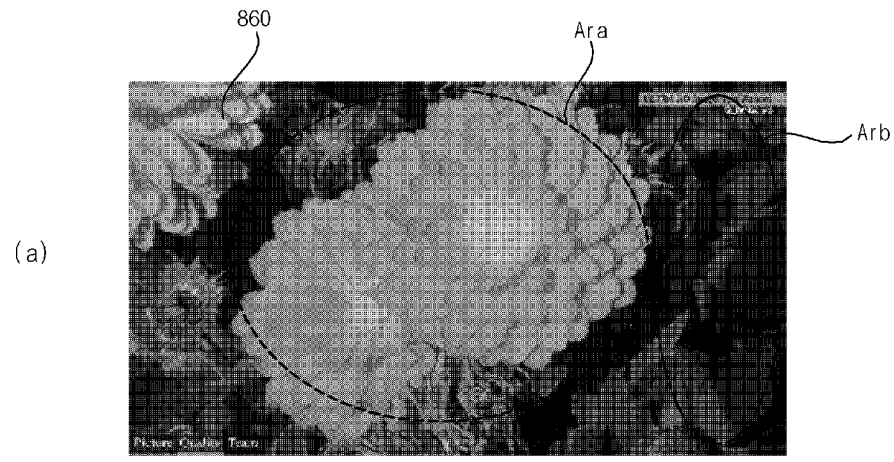
(a)
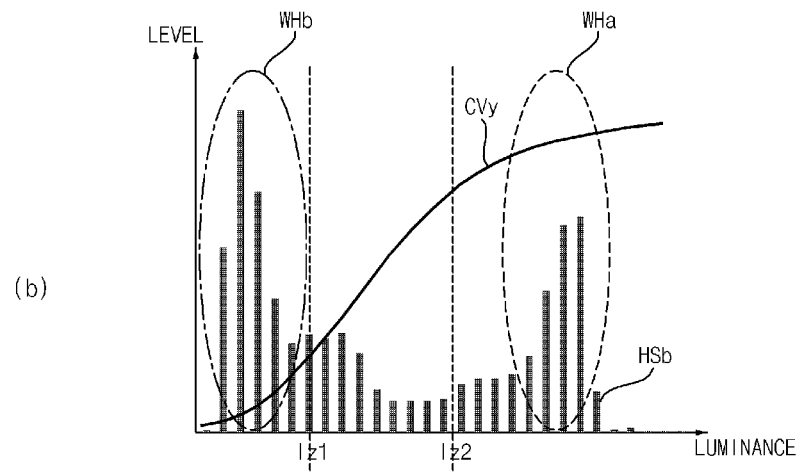
(b)
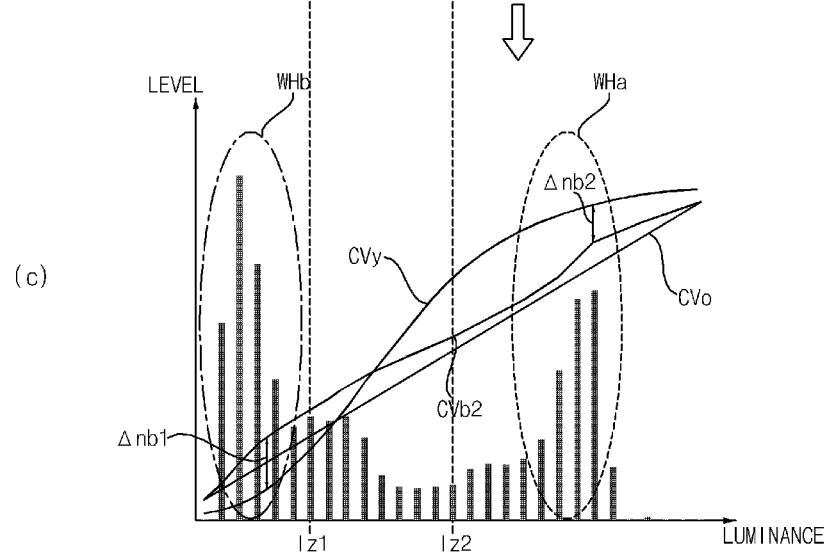
(c)

FIG. 15
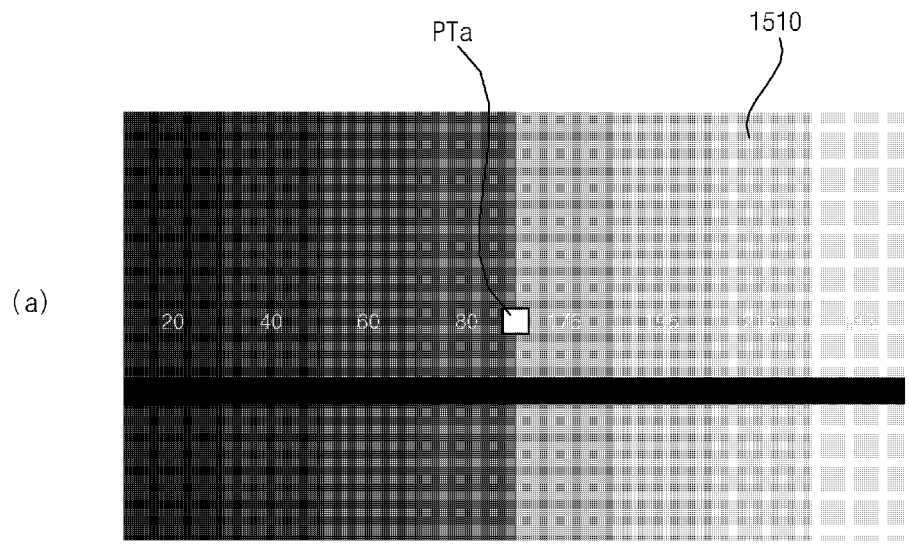
(a)
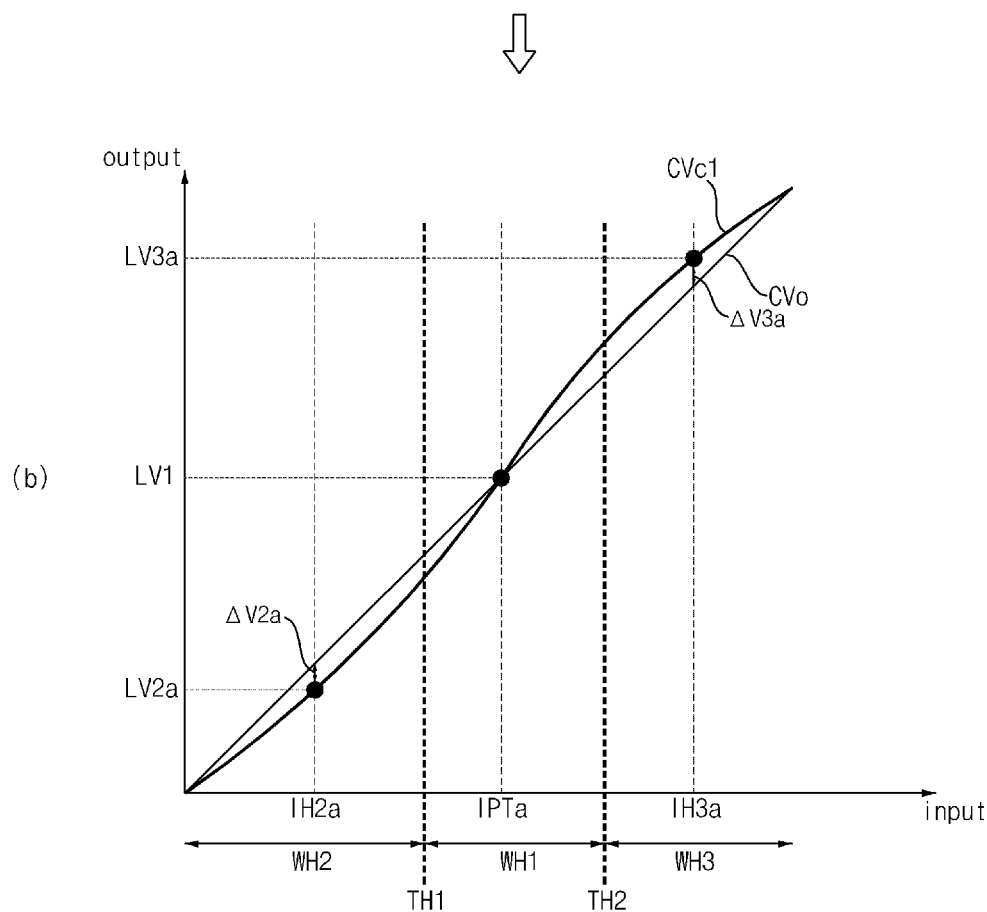
(b)

SIGNAL PROCESSING DEVICE TO IMPROVE CONTRAST OF A DISPLAYED IMAGE

CROSS-REFERENCE TO THE RELATED APPLICATION

Pursuant to 35 U.S.C. § 119(a), this application claims the benefit of earlier filing date and right of priority to Korean Patent Application No. 10-2020-0131016, filed on Oct. 12, 2020, the contents of which are hereby incorporated by reference herein in its entirety.

BACKGROUND OF THE DISCLOSURE

1. Field of the Disclosure

The present disclosure relates to a signal processing device and an image display apparatus including the same, and more particularly to a signal processing device and an image display apparatus including the same for improving contrast of an image displayed on a display.

2. Description of the Related Art

A signal processing device is a device that performs signal processing on an input image so as to display an image.

For example, the signal processing device may receive a broadcast signal or an HDMI signal, performs signal processing based on the received broadcast or HDMI signal, and output a processed image signal.

Meanwhile, with development of camera and broadcasting technologies, resolution and vertical synchronization frequencies of input images have improved as well. Specifically, there are increasing needs for image quality processing on an image having 4K resolution, 8K resolution, and so on.

Such image quality processing on an input image may be performed by a signal processing device. Accordingly, there are ongoing researches to study improved image quality processing by the signal processing device.

SUMMARY

It is an object of the present disclosure to provide a signal processing device and an image display apparatus including the same for improving contrast of an image displayed on a display.

It is another object of the present disclosure to provide a signal processing device and an image display apparatus including the same for improving contrast of an object in an image.

In accordance with an aspect of the present disclosure, the above objects may be accomplished by providing an image display apparatus includes a display, an image receiver configured to receive an input image, and a signal processing device configured to perform signal processing of the input image from the image receiver and to output image data to the display, wherein, when a luminance deviation of a first input image is greater than a luminance deviation of a second input image, the signal processing device controls a luminance adjustment change rate of the first input image to be less than a luminance adjustment change rate of the second input image.

In a state in which the first input image and the second input image have the same average luminance level, when a luminance deviation of the first input image is less than a luminance deviation of the second input image, the signal processing device may control a luminance adjustment change rate of the first input image to be greater than a luminance adjustment change rate of the second input image.

In a state in which the first input image and the second input image have the same average luminance level, when a luminance deviation of the first input image is greater than a luminance deviation of the second input image, the signal processing device may equalize a luminance adjustment level in an average luminance level of the first input image with a luminance adjustment level in an average luminance level of the second input image.

In a state in which the first input image and the second input image have the same average luminance level, when a luminance deviation of the first input image is greater than a luminance deviation of the second input image, the signal processing device may control a luminance adjustment change rate in a luminance level less than an average luminance level of the first input image to be less than a luminance adjustment change rate in a luminance level less than an average luminance level of the second input image.

In a state in which the first input image and the second input image have the same average luminance level, when a luminance deviation of the first input image is greater than a luminance deviation of the second input image, the signal processing device may control a luminance adjustment level in a luminance level less than an average luminance level of the first input image to be less than a luminance adjustment level in a luminance level less than an average luminance level of the second input image.

In a state in which the first input image and the second input image have the same average luminance level, when a luminance deviation of the first input image is greater than a luminance deviation of the second input image, the signal processing device may control a luminance adjustment change rate in a luminance level greater than an average luminance level of the first input image to be less than a luminance adjustment change rate in a luminance level greater than an average luminance level of the second input image.

In a state in which the first input image and the second input image have the same average luminance level, when a luminance deviation of the first input image is greater than a luminance deviation of the second input image, the signal processing device may control a luminance adjustment level in a luminance level greater than an average luminance level of the first input image to be less than a luminance adjustment level in a luminance level greater than an average luminance level of the second input image.

The signal processing device may adjust luminance of the input image based on luminance distribution of the input image and may perform control to increase a variation of the adjusted luminance as a frequency of the luminance distribution of the input image is increased.

The signal processing device may extract an object of the input image and may perform control to increase a luminance variation of the extracted object in response to luminance of the extracted object.

The signal processing device may perform control to increase a luminance variation of the extracted object as a peak of luminance distribution of the extracted object increases.

The signal processing device may perform control to increase a luminance variation of the extracted object as a deviation of luminance distribution of the extracted object decreases.

The signal processing device may extract a background of the input image and may perform control to increase a luminance variation of the extracted object in response to luminance of the extracted background.

The signal processing device may include an image analyzer configured to analyze the input image, and a luminance mapper configured to perform luminance mapping based on luminance information of the input image from the image analyzer, and in a state in which the first input image and the second input image have the same average luminance level, when a luminance deviation of the first input image is greater than a luminance deviation of the second input image, the luminance mapper may control a luminance adjustment change rate of the first input image to be less than a luminance adjustment change rate of the second input image.

In accordance with another aspect of the present disclosure, the above objects may be accomplished by providing an image display apparatus including a display, an image receiver configured to receive an input image, and a signal processing device configured to perform signal processing of the input image from the image receiver and to output image data to the display, wherein the signal processing device adjusts luminance of the input image based on luminance distribution of the input image and performs control to increase a variation of the adjusted luminance as a frequency of luminance distribution of the input image is increased.

The signal processing device may extract an object of the input image and may perform control to increase a luminance variation of the extracted object as a peak of luminance distribution of the extracted object increases.

The signal processing device may extract an object of the input image and may perform control to increase a luminance variation of the extracted object as a deviation of luminance distribution of the extracted object decreases.

In accordance with another aspect of the present disclosure, the above objects may be accomplished by providing a signal processing device including an image analyzer configured to analyze an input image, and a luminance mapper configured to perform luminance mapping based on luminance information of the input image from the image analyzer, wherein the luminance mapper controls a luminance adjustment change rate of a first input image to be less than a luminance adjustment change rate of a second input image when a luminance deviation of the first input image is greater than a luminance deviation of the second input image.

In a state in which the first input image and the second input image have the same average luminance level, when a luminance deviation of the first input image is greater than a luminance deviation of the second input image, the luminance mapper may control a luminance adjustment change rate in a luminance level less than an average luminance level of the first input image to be less than a luminance adjustment change rate in a luminance level less than an average luminance level of the second input image, and controls a luminance adjustment level in a luminance level less than an average luminance level of the first input image to be greater than a luminance adjustment level in a luminance level less than an average luminance level of the second input image.

In a state in which the first input image and the second input image have the same average luminance level, when a luminance deviation of the first input image is greater than a luminance deviation of the second input image, the luminance mapper may control a luminance adjustment change rate in a luminance level greater than an average luminance level of the first input image to be less than a luminance adjustment change rate in a luminance level greater than an average luminance level of the second input image, and may control a luminance adjustment level in a luminance level greater than the average luminance level of the first input image to be less than a luminance adjustment level in a luminance level greater than the average luminance level of the second input image.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 is an example of an internal block diagram of the signal processor in FIG. 2;

FIGS. 8A to 8D are diagrams for explaining a signal processing device related to the present disclosure;

FIG. 10 is a flowchart of a method of operating a signal processing device according to an embodiment of the present disclosure;

FIGS. 11A to 13 are diagrams for explaining an operation of the signal processing device of FIG. 10;

FIGS. 15 to 16 are diagrams for explaining an operation of the signal processing device of FIG. 14.

DETAILED DESCRIPTION OF THE PREFERRED EMBODIMENTS

Hereinafter, embodiments of the present disclosure will be described in further detail with reference to the accompanying drawings.

In the following description, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
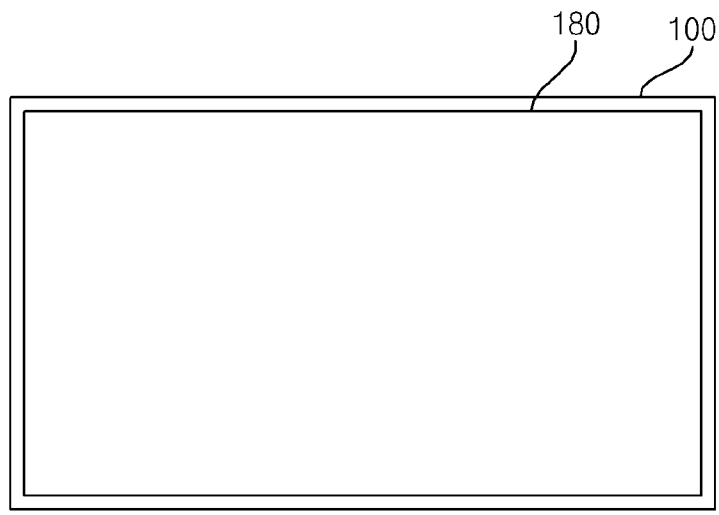
FIG. 1 is a diagram showing an image display apparatus according to an embodiment of the present disclosure.

FIG. 1 is a diagram showing an image display apparatus according to an embodiment of the present disclosure.

Referring to the drawing, an image display apparatus 100 according to an embodiment of the present disclosure may include a display 180.

The image display apparatus 100 according to an embodiment of the present disclosure may include a display 180, an image receiver 105 (refer to FIG. 2) for receiving an input image, and a signal processing device 170 (refer to FIG. 2) for performing signal processing of the input image from the image receiver 105 and outputting image data to the display 180, and when a luminance deviation of a first input image 1510 is greater than that of a second input image 1610, the signal processing device 170 may control luminance adjustment change rates $\Delta V2a$ and $\Delta V3a$ of the first input image 1510 to be less than luminance adjustment change rates $\Delta V2b$ and $\Delta V3b$ of the second input image 1610. Thus, contrast of an image displayed on the display 180 may be improved. In particular, contrast of an object in the image may be improved. In addition, contrast of a background in the image may be improved.

In the state in which the first input image 1510 and the second input image 1610 have the same average luminance level, when a luminance deviation of the first input image 1510 is less than that of the second input image 1610, the signal processing device 170 may control the luminance adjustment change rates $\Delta V2a$ and $\Delta V3a$ of the first input image 1510 to be greater than the luminance adjustment change rates $\Delta V2b$ and $\Delta V3b$ of the second input image 1610. Accordingly, contrast of an image displayed on the display 180 may be improved.

The image display apparatus 100 according to another embodiment of the present disclosure may include the display 180, the image receiver 105 (refer to FIG. 2) for receiving an input image, and the signal processing device 170 (refer to FIG. 2) for performing signal processing of the input image from the image receiver 105 and outputting image data to the display 180, and the signal processing device 170 may adjust the luminance of an input image based on luminance distribution of the input image, and may perform control to increase a variation of the adjusted luminance as a frequency of the luminance distribution of the input image is increased. Accordingly, contrast of an image displayed on the display 180 may be improved.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

Meanwhile, the OLED panel exhibits a faster response speed than the LED and is excellent in color reproduction.

The image display apparatus 100 according an embodiment of the present disclosure may control the luminance adjustment change rates $\Delta V2a$ and $\Delta V3a$ of the first input image 1510 to be less than the luminance adjustment change rates $\Delta V2b$ and $\Delta V3b$ of the second input image 1610 when a luminance deviation of the first input image 1510 is greater than that of the second input image 1610 even if the display 180 includes any one of a liquid crystal display panel (LCD panel), an organic light emitting diode panel (OLED panel), and an inorganic light emitting diode panel (LED panel). Accordingly, contrast of an image displayed on the display 180 may be improved.

The image display apparatus 100 according to another embodiment of the present disclosure may adjust the luminance of an input image based on luminance distribution of an input image, and may perform control to increase a variation of the adjusted luminance as a frequency of the luminance distribution of the input image is increased. Accordingly, contrast of an image displayed on the display 180 may be improved.

The image display apparatus 100 of FIG. 1 may be a television (TV), a monitor, a tablet PC, a mobile terminal, a vehicle display device, or the like.

Figure 2:
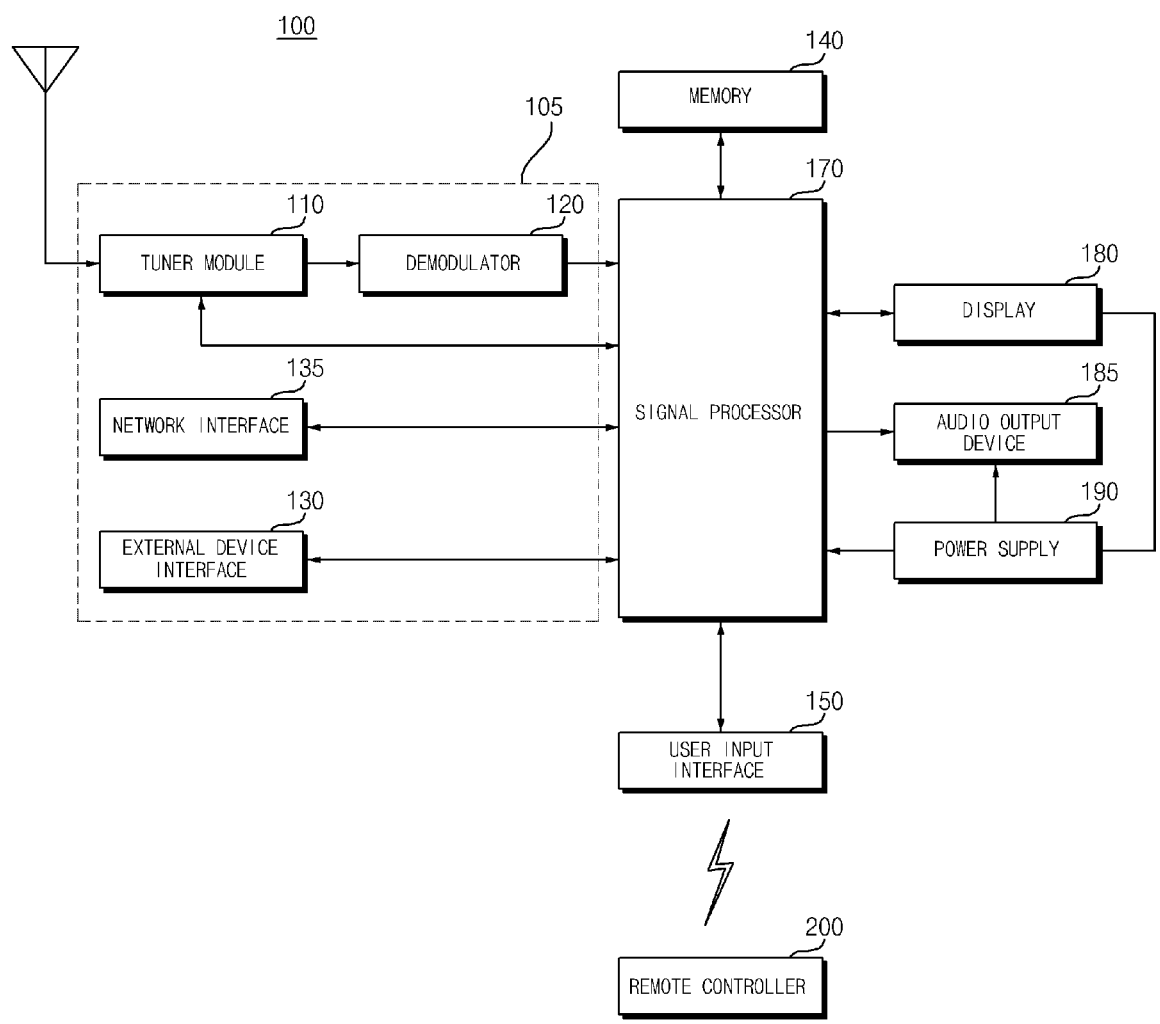
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, an external device interface 130, a memory 140, a user input interface 150, a sensor device (not shown), a signal processor 170, a display 180, and an audio output device 185.

The image receiver 105 may receive an input image. For example, the image receiver 105 may receive an external input image such as a broadcast image, an HDMI image, or a streamed image.

The image receiver 105 may include a tuner module 110, a demodulator 120, a network interface 135, and an external device interface 130.

Meanwhile, unlike the drawing, the image receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 may process a digital broadcast signal or an analog broadcast signal. The analog baseband image or audio signal (CVBS/SIF) output from the tuner module 110 may be directly input to the signal processor 170.

Meanwhile, the tuner module 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processor 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor device (not shown) that senses a user's gesture to the signal processor 170, or may transmit a signal from the signal processor 170 to the sensor device (not shown).

The signal processor 170 may demultiplex the input stream through the tuner module 110, the demodulator 120, the network interface 135, or the external device interface 130, or process the demultiplexed signals to generate and output a signal for image or audio output.

For example, the signal processor 170 may receive a broadcast signal received by the image receiver 105 or an HDMI signal, and may perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external device interface 130.

The audio signal processed by the signal processor 170 may be output to the audio output device 185 as an audio signal. In addition, audio signal processed by the signal processor 170 may be input to the external output apparatus through the external device interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 may control the overall operation of the image display apparatus 100. For example, the signal processor 170 may control the tuner module 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processor 170, an image signal, a data signal, a control signal, and the like received from the external device interface 130.

Meanwhile, the display 180 may be configured as a touch screen and used as an input device in addition to an output device.

The audio output device 185 receives a signal processed by the signal processor 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor device (not shown), or a combination thereof. The signal processor 170 may be configured in the form of a system on chip (SOC).

The power supply 190 supplies corresponding power to the image display apparatus 100. Particularly, the power may be supplied to a controller 170 which may be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

FIG. 3 is an example of an internal block diagram of the signal processor in FIG. 2.

Referring to the drawing, the signal processor 170 according to an embodiment of the present disclosure may include a demultiplexer 310, a video processor 320, a processor 330, and an audio processor 370. In addition, the signal processor 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner module 110, the demodulator 120, or the external device interface 130.

The video processor 320 may perform signal processing on an input image. For example, the video processor 320 may perform image processing on an image signal demultiplexed by the demultiplexer 310.

To this end, the video processor 320 may include an video decoder 325, a scaler 335, an image quality processor 635, an video encoder (not shown), an OSD processor 340, a frame rate converter 350, a formatter 360, etc.

The video decoder 325 decodes a demultiplexed image signal, and the scaler 335 performs scaling so that the resolution of the decoded image signal may be output from the display 180.

The video decoder 325 may include a decoder of various standards. For example, a 3D video decoder for MPEG-2, H.264 decoder, a color image, and a depth image, and a decoder for a multiple view image may be provided.

The scaler 335 may scale an input image signal decoded by the video decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the video decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter 350 may convert a frame rate of the input image. The frame rate converter 350 may output the image without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change the format of the image signal. For example, it may change the format of the 3D image signal into any one of various 3D formats such as a side by side format, a top/down format, a frame sequential format, an interlaced format, a checker box format, and the like.

The processor 330 may control overall operations of the image display apparatus 100 or the signal processor 170.

For example, the processor 330 may control the tuner module 110 to control the tuning of an RF broadcast corresponding to a channel selected by a user or a previously stored channel In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the video processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it may be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the video processor 320.

Figure 4A:
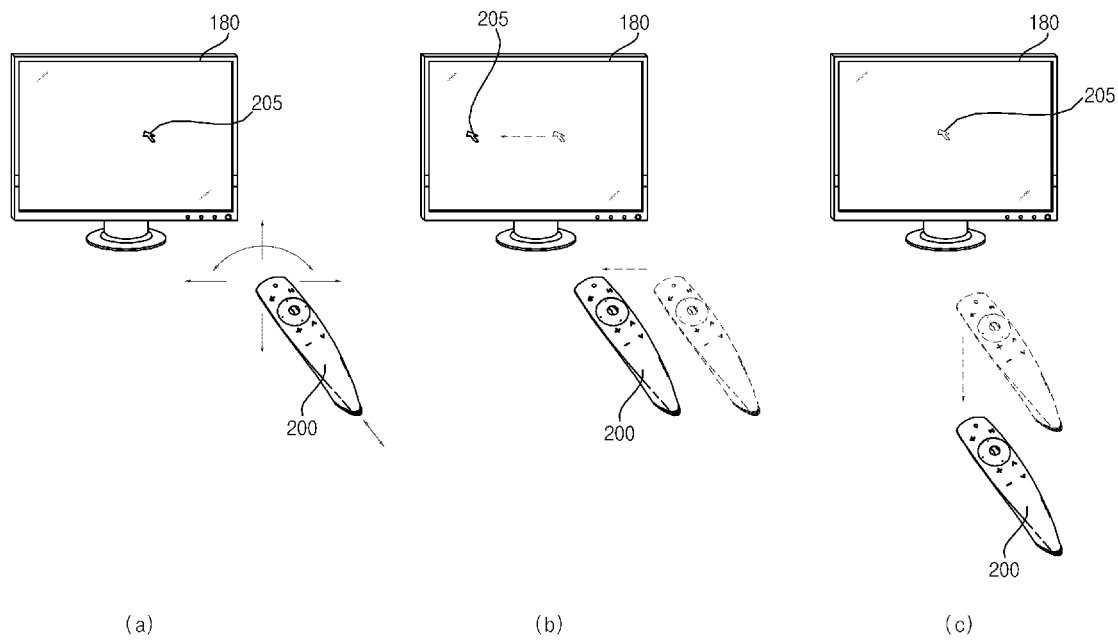
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it may be displayed to be enlarged. On the other hand, when the user moves the remote controller 200 close to the display 180, the selection area within the display 180 corresponding to the pointer 205 may be zoomed out so that it may be displayed to decrease. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
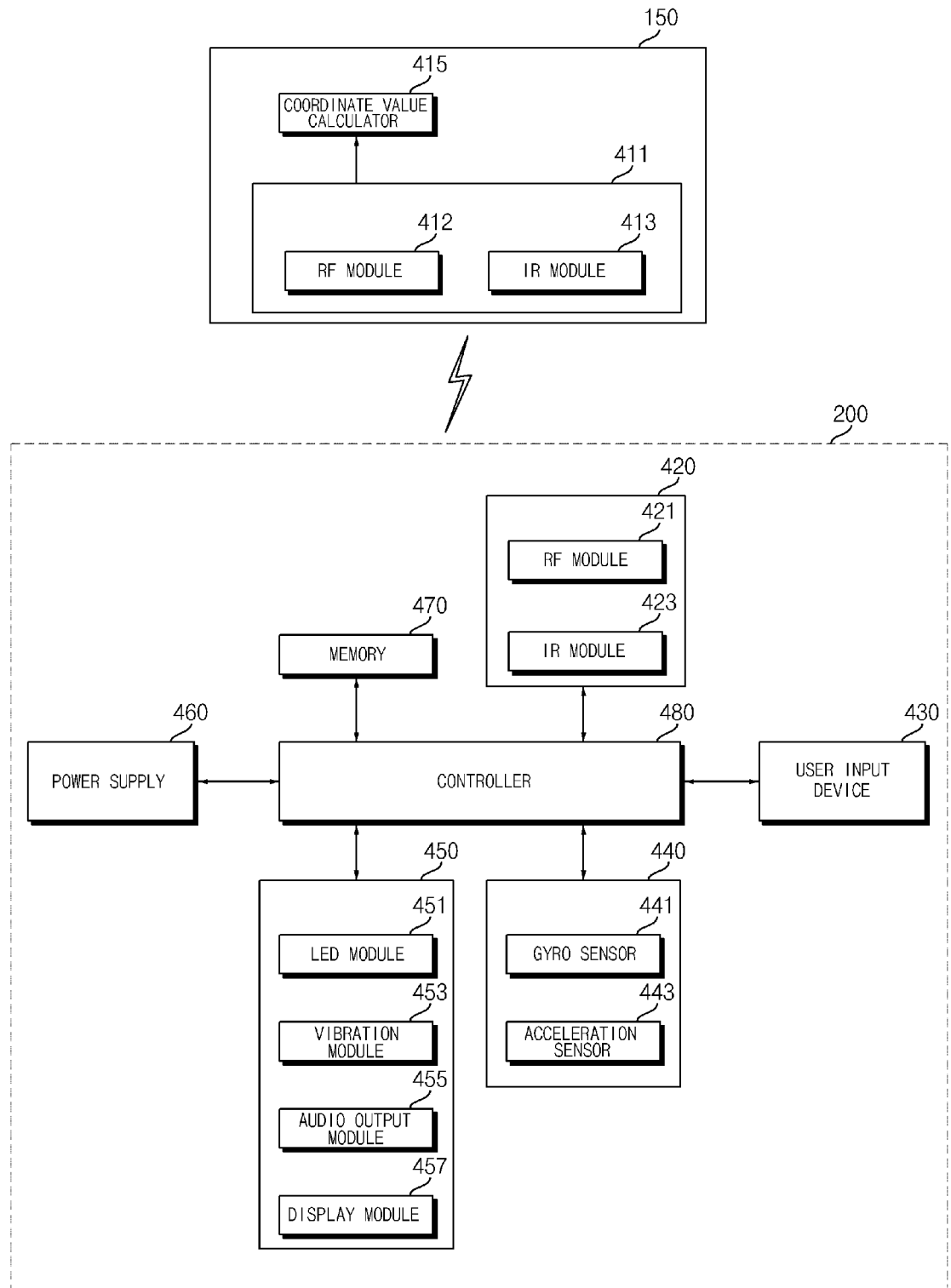
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input device 430, a sensor device 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user may input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless communicator 425.

The user input interface 150 of the image display apparatus 100 includes a wireless communicator 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless communicator 151 and may calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

Figure 5:
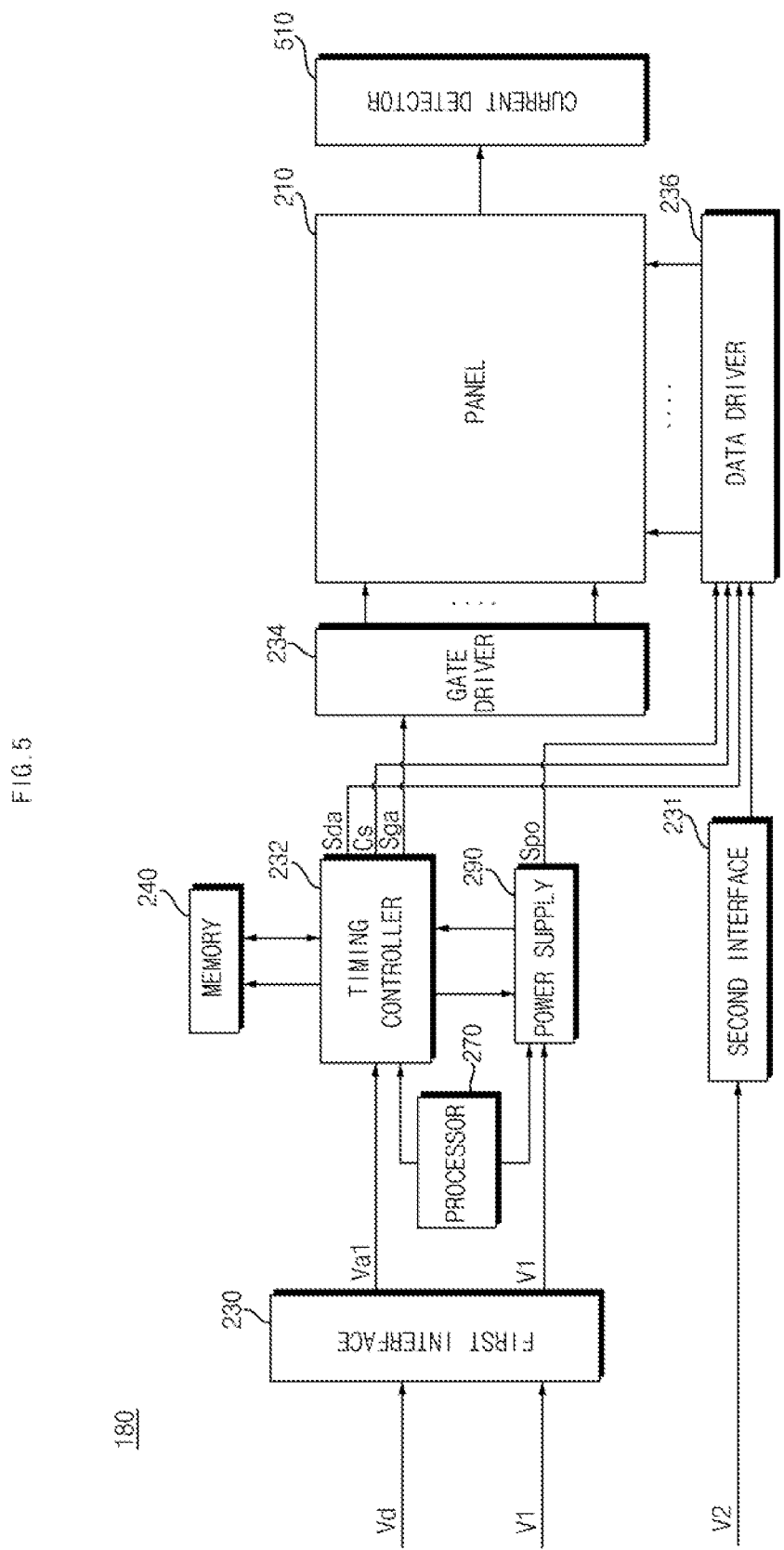
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
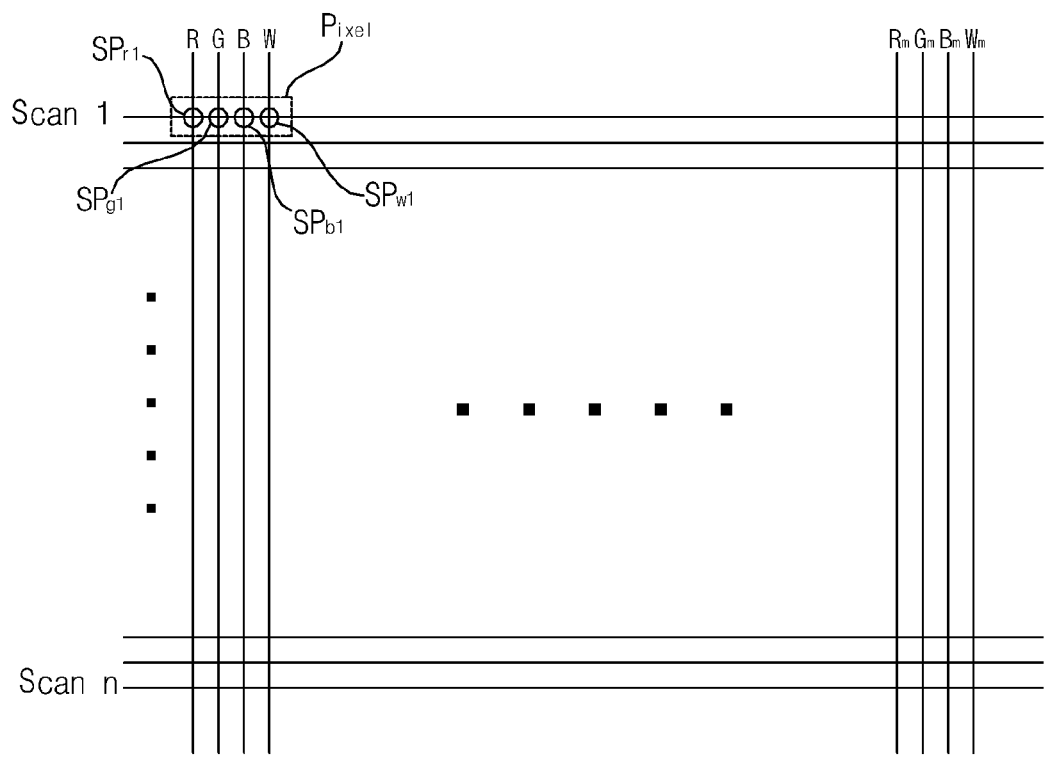
FIG. 6A and FIG. 6B are diagrams referred to in the description of an organic light emitting diode panel of FIG. 5.
Figure 6B:
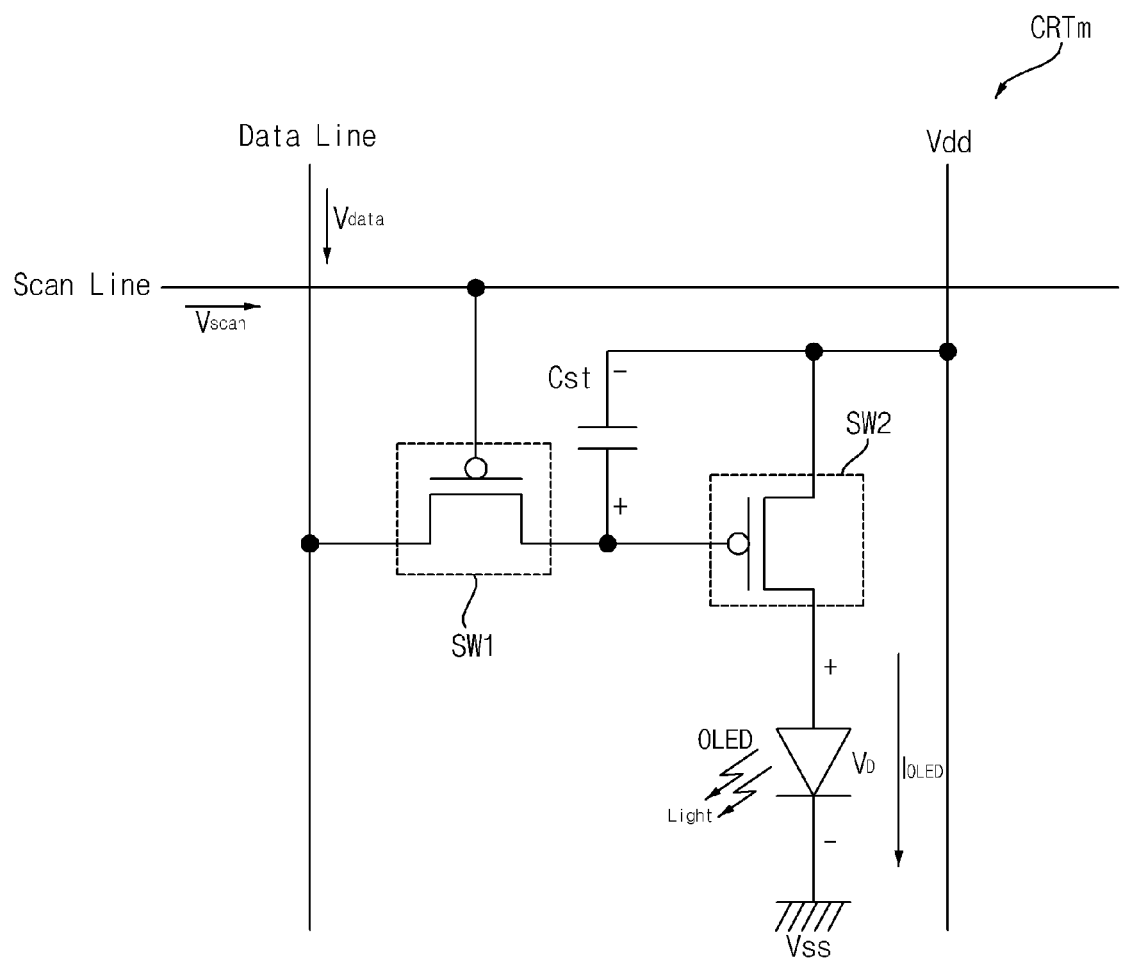

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with development of camera and broadcasting technologies, resolution and vertical synchronization frequencies for input images have improved as well. In particular, there is increasing need of image quality processing on an image signal having 4K resolution and 120 Hz vertical synchronization frequency. Accordingly, a method of improving image quality processing of an input image signal is proposed. A detailed description thereof is hereinafter provided with reference to FIG. 7 and other drawings.

Figure 7:
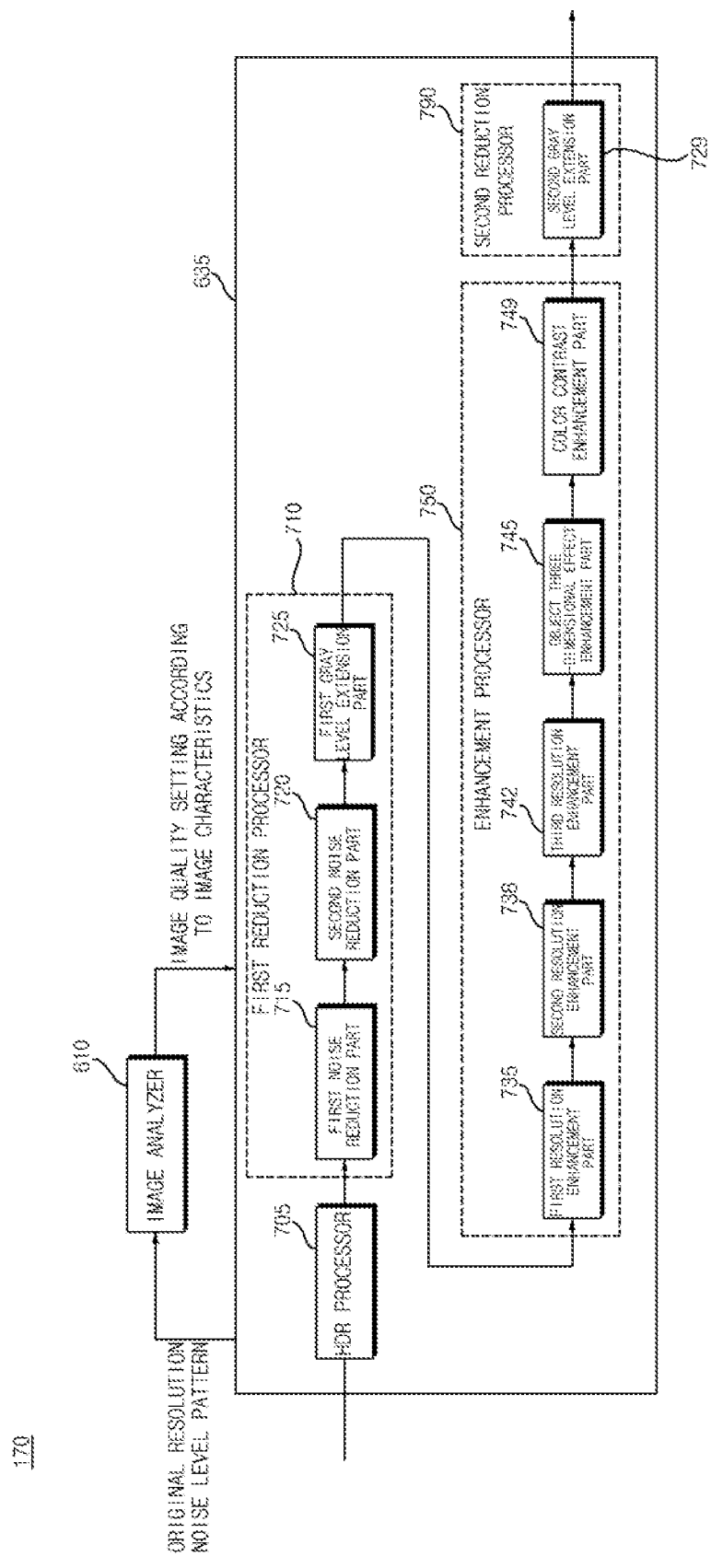
FIG. 7 is an example of an internal block diagram of the signal processing device of FIG. 2.

FIG. 7 is an example of an internal block diagram of the signal processing device of FIG. 2.

Referring to the drawing, the signal processing device 170 according to an embodiment of the present disclosure may include an image analyzer 610 and an image quality processor 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the video decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reduction processor 710, an enhancement processor 750, and a second reduction processor 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 may perform gray level conversion. Accordingly, the contrast of an image displayed on a display may be improved.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

The HDR processor 705 may perform gray level conversion processing based on a first gray level conversion curve or a second gray level conversion curve.

For example, the HDR processor 705 may perform gray level conversion processing based on data in a lookup table corresponding to the first gray level conversion curve or based on data in a lookup table corresponding to the second gray level conversion curve.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation of input data and the first gray level conversion mode in a lookup table determined by the equation. Here, the input data may include video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation of input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in the second gray level extension part 729 in the second reduction processor 790.

For example, if the third gray level conversion mode is implemented, the second gray level extension part 729 in the second reduction processor 790 may perform gray level conversion processing based o data corresponding to the third gray level conversion mode in a lookup table.

Specifically, if the third gray level conversion mode is implemented, the second gray level extension part 729 in the second reduction processor 790 may perform gray level conversion processing based on an equation of input data and data corresponding to the third gray level conversion mode in a lookup table determined by the equation. Here, the input data may include video data and metadata.

Meanwhile, if the fourth type gray level conversion is implemented, the second gray level extension part 729 in the second reduction processor 790 may perform gray level conversion processing based on data corresponding to the fourth gray level conversion mode in a lookup table.

Specifically, if the fourth gray level conversion mode is implemented, the second gray level extension part 729 in the second reduction processor 790 may perform gray level conversion processing based on an equation of input data and data corresponding to the fourth gray level conversion mode in a lookup table determined by the equation. Here, the input data may include video data and metadata.

For example, if the fourth gray level conversion mode is implemented in the second gray level extension part 729 in the second reduction processor 790, the HDR processor 705 may implement the second gray level conversion mode.

For another example, if the third gray level conversion mode is implemented in the second gray level extension part 729 in the second reduction processor 790, the HDR processor 705 may implement the first gray level conversion mode.

Alternatively, the second gray level extension part 729 in the second reduction processor 790 may change a gray level conversion mode according to a gray level conversion mode in the HDR processor 705.

For example, if the second gray level conversion mode is implemented in the HDR processor 705, the second gray level extension part 729 in the second reduction processor 790 may perform the fourth gray level conversion mode.

For another example, if the first gray level conversion mode is implemented in the HDR processor 705, the second gray level extension part 729 in the second reduction processor 790 may implement the third gray level conversion mode.

Meanwhile, the HDR processor 705 according to an embodiment of the present disclosure may implement a gray level conversion mode so that low gray level and high gray level are converted uniformly.

That is, the HDR processor 705 may perform gray level conversion processing based on the second gray level conversion curve, not the first gray level conversion curve.

Meanwhile, according to the second gray level conversion mode in the HDR processor 705, the second reduction processor 790 may implement the fourth gray level conversion mode and thereby amplify an upper limit on gray level of a received input signal. Accordingly, the contrast of an image displayed on a display may be improved.

Next, the first reduction processor 710 may perform noise reduction on an input image signal or an image signal processed by the HDR processor 705.

Specifically, the first reduction processor 710 may perform multiple stages of noise reduction processing and a first stage of gray level extension processing on an input image signal or an HDR image from the HDR processor 705.

To this end, the first reduction processor 710 may include a plurality of noise reduction parts 715 and 720 for reducing noise in multiple stages, and a first gray level extension part 725 for extending gray level.

Next, the enhancement processor 750 may perform multiple stages of image resolution enhancement processing on an image from the first reduction processor 710.

In addition, the enhancement processor 750 may perform object three-dimensional effect enhancement processing. In addition, the enhancement processor 750 may perform color or contrast enhancement processing.

To this end, the enhancement processor 750 may include: a plurality of resolution enhancement parts 735, 738, 742 for enhancing a resolution of an image in multiple stages; an object three-dimensional effect enhancement part 745 for enhancing a three-dimensional effect of an object; and a color contrast enhancement part 749 for enhancing color or contrast.

Next, the second reduction processor 790 may perform a second stage of gray level extension processing based on a noise-reduced image signal received from the first reduction processor 710.

Meanwhile, the second reduction processor 790 may amplify an upper limit on gray level of an input signal, and extend a resolution of high gray level of the input signal. Accordingly, the contrast of an image displayed on a display may be improved.

For example, gray level extension may be performed uniformly on the entire gray level range of an input signal. Accordingly, gray level extension is performed uniformly on the entire area of an input image, thereby improving high gray level expression.

Meanwhile, the second reduction processor 790 may perform gray level amplification and extension based on a signal received from the first gray level extension part 725. Accordingly, the contrast of an image displayed on a display may be improved.

Meanwhile, if an input image signal input is an SDR image signal, the second reduction processor 790 may vary the degree of amplification based on a user input signal. Accordingly, it is possible to improve high gray level expression in response to a user setting.

Meanwhile, if an input image signal is an HDR image signal, the second reduction processor 790 may perform amplification according to a set value. Accordingly, the contrast of an image displayed on a display may be improved.

Meanwhile, if an input image signal is an HDR image signal, the second reduction processor 790 may vary the degree of amplification based on a user input signal. Accordingly, it is possible to improve high gray level expression according to a user setting.

Meanwhile, in the case of extending gray level based on a user input signal, the second reduction processor 790 may vary the degree of extension of gray level. Accordingly, it is possible to improve high gray level expression according to a user's setting.

Meanwhile, the second reduction processor 790 may amplify an upper limit on gray level according to a gray level conversion mode in the HDR processor 705. Accordingly, the contrast of an image displayed on a display may be improved.

The signal processing device 170 includes the HDR processor 705 configured to receive an image signal and adjust luminance of the input image signal, and the reduction processor 790 configured to amplify luminance of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of luminance of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of luminance of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted luminance of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reduction processor 790 may include the second gray level extension part 729 configured to amplify an upper limit on gray level of an input signal, and a decontouring part (not shown) configured to extend the resolution of gray level amplified by the second gray level extension part 729.

The second reduction processor 790 may include a second gray level extension part 729 for a second stage of gray level extension.

Meanwhile, the image quality processor 635 in the signal processing device 170 according to the present disclosure is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reduction processor 710, and the two stages of gray level extension processing may be performed by the first gray level extension part 725 in the first reduction processor 710 and the second gray level extension part 729 in the second reduction processor 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancement parts 735, 738, and 742, and the object three-dimensional effect enhancement may be performed by the object three-dimensional enhancement processor 745.

Meanwhile, the first characteristic of the signal processing device 170 of the present disclosure lies in applying the same algorithm or similar algorithms to image quality processing multiple times, thereby gradually enhancing an image quality.

To this end, the image quality processor 635 of the signal processing device 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, another characteristic of the signal processing device 170 of the present disclosure lies in performing noise reduction processing in multiple stages. Each stage of noise reduction processing may include temporal processing and spatial processing.

Meanwhile, the high dynamic range (HDR) technique utilizes a much greater range of luminosity (nit) than is possible a standard dynamic range (SDR) or any other existing technique, and accordingly a much wide range of contrast may be expressed.

Recently, it is possible to generate a high dynamic range image using a high-specification camera having a wide dynamic range.

Meanwhile, a SDR image is in an ordinary dynamic range, and may express approximately 100 nit or less according to a broadcasting standard.

However, the high dynamic range technique, which has been widely used in recent years, enables expressing a wider range up to approximately 10,000 nit.

Accordingly, when the high dynamic range technique is employed, image characteristics changes greatly compared to the existing ordinary dynamic range, and thus, it is required to change overall system such as an image format, a related metadata, a compression scheme, an interface between devices, the display 180, etc. in order to express the change in the image characteristics.

In the image display apparatus 100 which has been developed with a wider dynamic range, when an existing ordinary dynamic range image or a high dynamic range image is reproduced, tone mapping may be performed to maintain the quality of a source image intact.

In particular, since there are many cases where the dynamic range of an image is different from the dynamic range of the display 180, it is necessary to map the dynamic range of the image suitably for the display 180.

Meanwhile, it is necessary to express luminance (luminance) of a reproducible range intact and perform image quality processing on a luminance component of a non-reproducible range so as to minimize damage to image quality compared to a source image. In addition, a transformation function by which a user's desired intention is reflected is required as well.

FIGS. 8A to 8D are diagrams for explaining a signal processing device related to the present disclosure.

Figure 8A:
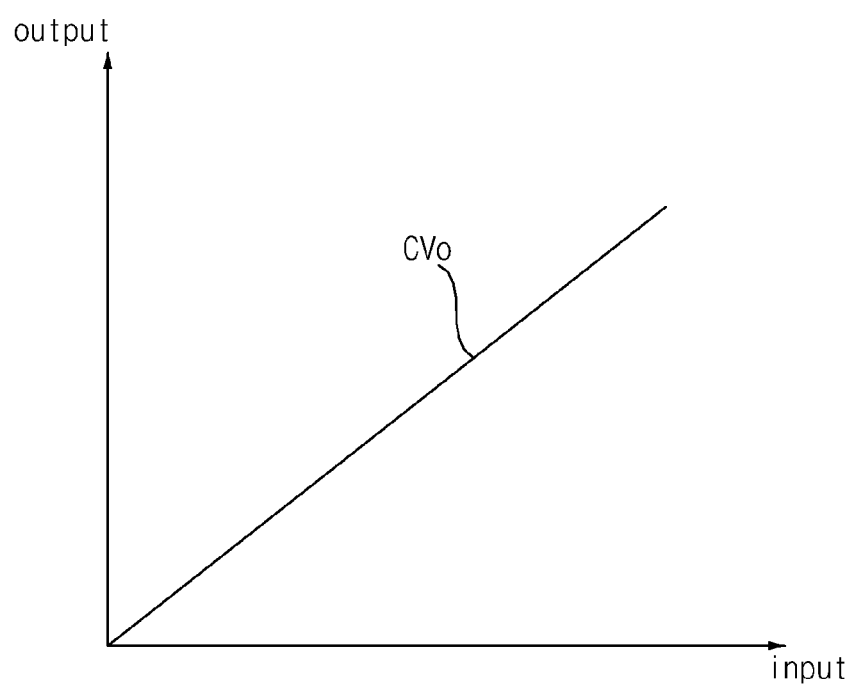

First, FIG. 8A is a diagram showing an example of luminance mapping of an input image.

Referring to the drawing, luminance mapping of an input image may be performed based on a first curve CVo.

According to the first curve CVo, luminance INPUT of the input image may be bypassed and may be output as output luminance OUTPUT intact.

In this case, the luminance INPUT of the input image may be referred to as a luminance level of the input image, and the output luminance OUTPUT may be referred to as a luminance adjustment level or a luminance mapping level.

Figure 8B:
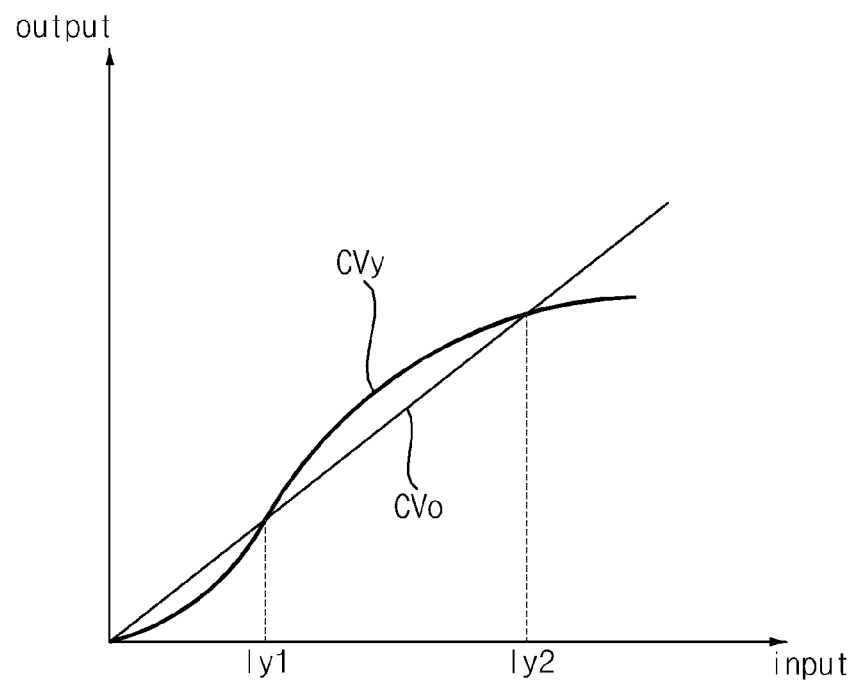

Next, FIG. 8B is a diagram showing another example of luminance mapping of an input image.

Referring to the drawing, luminance mapping of the input image may be performed based on a second curve CVy.

According to the second curve CVy, when luminance INPUT of the input image is less than ly1, the second curve CVy may be lower than the output luminance OUTPUT of the first curve CVo, when the luminance INPUT of the input image is between ly1 and ly2, the second curve CVy may be higher than the output luminance OUTPUT of the first curve CVo, and when the luminance INPUT of the input image is greater than ly2, the second curve CVy may be lower than the output luminance OUTPUT of the first curve CVo.

That is, according to the second curve CVy of FIG. 8B, a level of the output luminance OUTPUT may vary depending on a luminance level or a gray level of the luminance INPUT of an input image.

According to the second curve CVy of FIG. 8B, luminance mapping of the input image may be performed, and when the image on which luminance mapping is performed is displayed on the display 180, it may be possible to achieve dynamic contrast.

FIG. 8C illustrates an example of a first input image 810 and a first luminance histogram Hsa showing luminance distribution of the first input image 810.

In the drawing, the luminance histogram Hsa indicates a frequency depending on the luminance of the first input image 810.

Referring to the drawing, the first input image 810 may be an image including a face object region, and a face object region Arm may have a luminance level between luminance level Iz1 and luminance level Iz2 of the first luminance histogram Hsa.

Referring to the drawing, most of luminance levels of the first input image 810 may distribute to luminance level Iz2 from luminance level 0 and seldom distribute between luminance level Iz2 and the maximum luminance level.

Thus, according to the second curve CVy of FIG. 8B, when luminance mapping is performed, if the luminance level of the first input image 810 distributes between luminance level Iz2 and luminance level 0, a luminance adjustment level based on luminance mapping may not be sufficient, and if the luminance level of the first input image 810 distributes to the maximum luminance level from luminance level z2, it may be disadvantageous that a luminance adjustment level during luminance mapping is excessively converted.

FIG. 8D illustrates an example of a second input image 860 and a second luminance histogram Hsb showing luminance distribution of the second input image 860.

In the drawing, the luminance histogram Hsa indicates a frequency depending on the luminance of the second input image 860.

Referring to the drawing, the second input image 860 may be an image including a flower object region Ara and a background region Aub, the flower object region Ara may have a luminance level between luminance level Iz2 and the maximum luminance level (WHa) of the second luminance histogram Hsb, and the background region Aub may have a luminance level between luminance level 0 and luminance level Iz1 (WHb) of the second luminance histogram Hsb.

Referring to the drawing, most of luminance levels of the second input image 860 may distribute between luminance level Iz1 and luminance level 0 or between luminance level Iz2 and the maximum luminance level and seldom distribute between luminance level Iz1 and luminance level Iz2.

Thus, according to the second curve CVy of FIG. 8B, when luminance mapping is performed, if the luminance level of the second input image 860 distributes between luminance level 0 and luminance level Iz1 or between luminance level Iz2 and the maximum luminance level, a luminance adjustment level based on luminance mapping may not be sufficient, and if the luminance level of the second input image 860 distributes between luminance level Iz1 and luminance level Iz2, it may be disadvantageous that a luminance adjustment level during luminance mapping is excessively converted.

When the second input image 860 has the same average luminance level as that of the first input image 810 of FIG. 8C, luminance mapping may be performed based on the same second curve CVy, and as described above, it may be disadvantageous that accurate luminance mapping is not performed for each object region.

Thus, the present disclosure proposes a method for improving contrast of an image displayed on the display 180 by adaptively performing luminance mapping depending on luminance distribution of an input image. In particular, the present disclosure proposes a method of improving contrast of a main object in an image.

This will be described below with reference to FIG. 9 and subsequent drawings.

Figure 9:
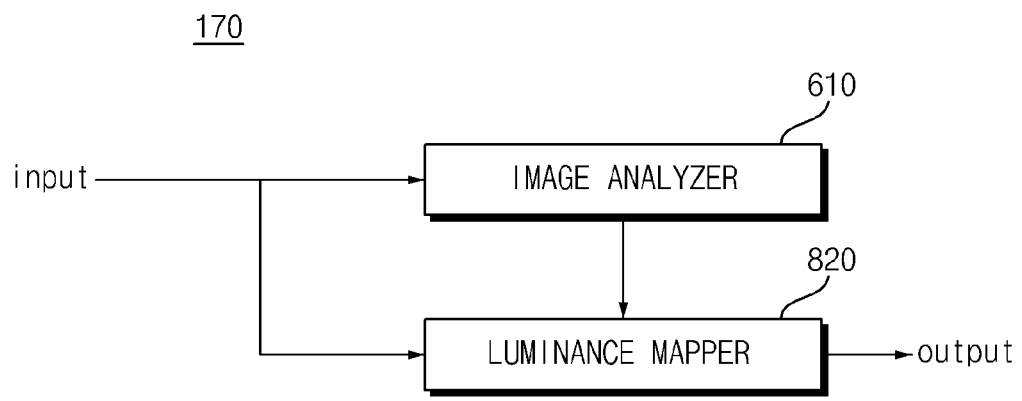
FIG. 9 is an internal block diagram of a signal processing device according to an embodiment of the present disclosure.

FIG. 9 is an internal block diagram of a signal processing device according to an embodiment of the present disclosure.

Referring to the drawing, the signal processing device 170 according to an embodiment of the present disclosure may include an image analyzer 610 for analyzing an input image, and a luminance mapper 820 for performing luminance mapping based on luminance information of the input image from the image analyzer 610.

The luminance mapper 820 in the signal processing device 170 according to an embodiment of the present disclosure may control the luminance adjustment change rates $\Delta V2a$ and $\Delta V3a$ of the first input image 1510 to be less than the luminance adjustment change rates $\Delta V2b$ and $\Delta V3b$ of the second input image 1610 when a luminance deviation of the first input image 1510 is greater than that of the second input image 1610. Accordingly, contrast of an image displayed on the display 180 may be improved. In particular, contrast of a main object in the image may be improved. In addition, contrast of a background in the image may be improved.

In the state in which the first input image 1510 and the second input image 1610 have the same average luminance level, when a luminance deviation of the first input image 1510 is less than that of the second input image 1610, the luminance mapper 820 in the signal processing device 170 according to an embodiment of the present disclosure may control the luminance adjustment change rates $\Delta V2a$ and $\Delta V3a$ of the first input image 1510 to be greater than the luminance adjustment change rates $\Delta V2b$ and $\Delta V3b$ of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 according to an embodiment of the present disclosure may equalize a luminance adjustment level LV1 in an average luminance level IPTa of the first input image 1510 with the luminance adjustment level LV1 in an average luminance level IPTb of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 of the signal processing device 170 according to an embodiment of the present disclosure may control a luminance adjustment change rate $\Delta V2a$ in a luminance level IH2a that is less than the average luminance level of the first input image 1510 to be less than a luminance adjustment change rate $\Delta V2b$ in a luminance level IH2b that is less than the average luminance level of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 according to an embodiment of the present disclosure may control a luminance adjustment level LV2a in the luminance level IH2a that is less than an average luminance level of the first input image 1510 to be greater than a luminance adjustment level LV2b in the luminance level IH2b that is less than an average luminance level of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 according to an embodiment of the present disclosure may control a luminance adjustment change rate $\Delta V3a$ in a luminance level IH3a that is greater than the average luminance level of the first input image 1510 to be less than a luminance adjustment change rate $\Delta V3b$ in a luminance level IH3b that is greater than the average luminance level of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 according to an embodiment of the present disclosure may control a luminance adjustment level LV3a in the luminance level IH2b that is greater than the average luminance level of the first input image 1510 to be less than a luminance adjustment level LV3b in the luminance level IH3b that is greater than the average luminance level of the second input image 1610. Accordingly, contrast of an image displayed on the display 180 may be improved.

The luminance mapper 820 in the signal processing device 170 according to an embodiment of the present disclosure may adjust the luminance of the input image based on luminance distribution of the input image and may perform control to increase a variation of the adjusted luminance as a frequency of the luminance distribution of the input image is increased. Accordingly, contrast of an image displayed on the display 180 may be improved.

The luminance mapper 820 in the signal processing device 170 according to an embodiment of the present disclosure may extract an object of the input image 810 or 860 and may perform control to increase a luminance variation of the extracted object Arm or Ara in response to the luminance of the extracted object Arm or Ara. Accordingly, contrast of an image displayed on the display 180 may be improved.

The luminance mapper 820 in the signal processing device 170 according to an embodiment of the present disclosure may perform control to increase a luminance variation of the extracted object Arm or Ara as a peak of luminance distribution of the extracted object Arm or Ara increases. Accordingly, contrast of an image displayed on the display 180 may be improved.

The luminance mapper 820 in the signal processing device 170 according to an embodiment of the present disclosure may perform control to increase a luminance variation of the extracted object Arm or Ara as a deviation of luminance distribution of the extracted object Arm or Ara decreases. Accordingly, contrast of an image displayed on the display 180 may be improved.

The luminance mapper 820 in the signal processing device 170 according to an embodiment of the present disclosure may extract a background of an input image and may perform control to increase a luminance variation of the extracted object Arm or Ara in response to the luminance of the extracted background. Accordingly, contrast of an image displayed on the display 180 may be improved.

FIG. 10 is a flowchart of a method of operating a signal processing device according to an embodiment of the present disclosure. FIGS. 11A to 13 are diagrams for explaining an operation of the signal processing device of FIG. 10.

Referring to the drawing, the image receiver 105 in the signal processing device 170 according to an embodiment of the present disclosure may receive an input image.

The image analyzer 610 in the signal processing device 170 may acquire luminance information of an input image (S1010).

Then, the image analyzer 610 in the signal processing device 170 may calculate a luminance histogram of the input image (S1020).

Figure 12:
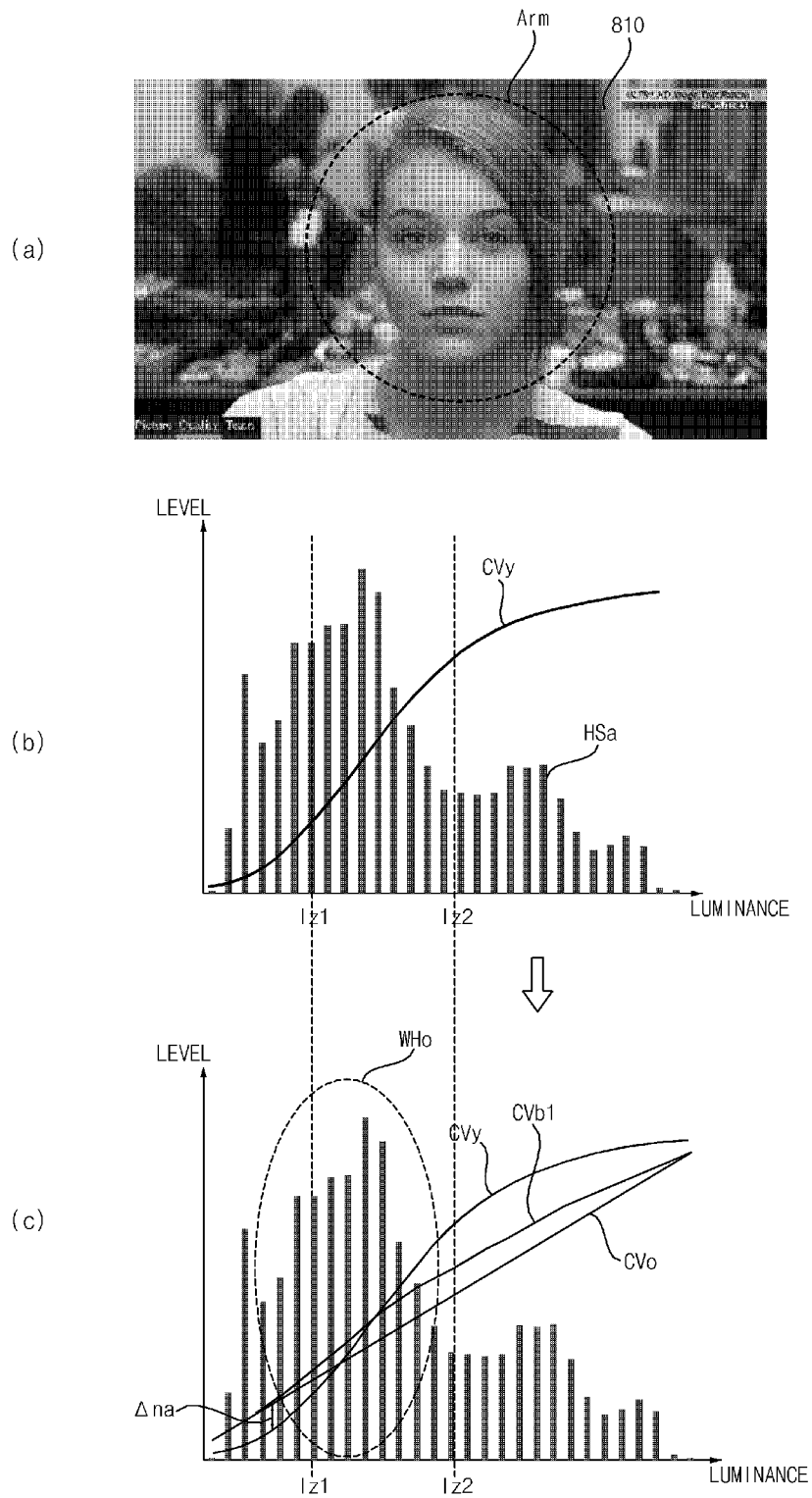

For example, when the input image is the first input image 810 shown in FIG. 12, the first luminance histogram Hsa of the first input image 810 may be calculated.

In another example, when the input image is the second input image 860 shown in FIG. 13, the second luminance histogram Hsb of the second input image 860 may be calculated.

In another example, when the input image is a third input image (not shown), a third luminance histogram HSm of the third input image may be calculated.

Figure 11A:
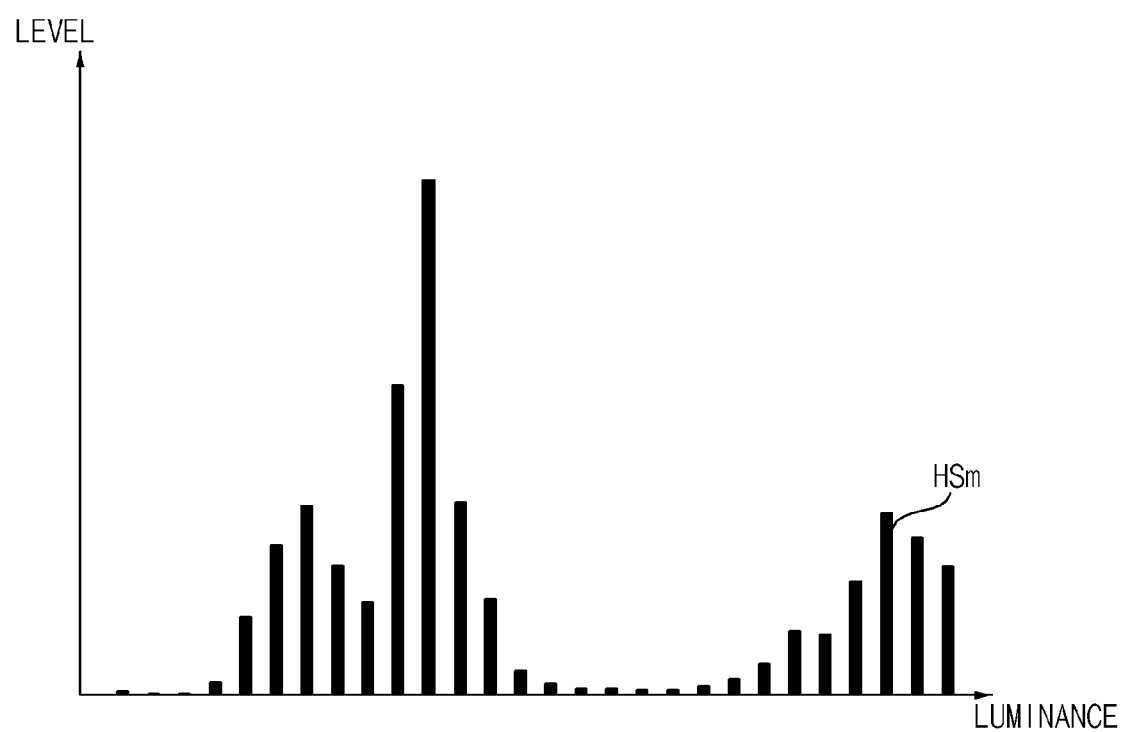

FIG. 11A is a diagram showing an example of the third luminance histogram HSm indicating luminance distribution and a frequency of the third input image.

Referring to the drawing, in the third luminance histogram HSm, a frequency of a low luminance level may be a peak, a frequency of a medium luminance level may be almost zero, and a frequency a high luminance level may be partially present.

Then, the luminance mapper 820 in the signal processing device 170 may calculate a gain based on a luminance histogram of the input image (S1030).

The luminance mapper 820 in the signal processing device 170 may calculate a curve depending on a frequency of the luminance histogram.

Then, the luminance mapper 820 in the signal processing device 170 may map luminance of the input image and may output the luminance-adjusted luminance adjustment level based on the calculated gain (S1040). That is, the luminance mapper 820 in the signal processing device 170 may perform luminance mapping based on the calculated gain.

Figure 11B:
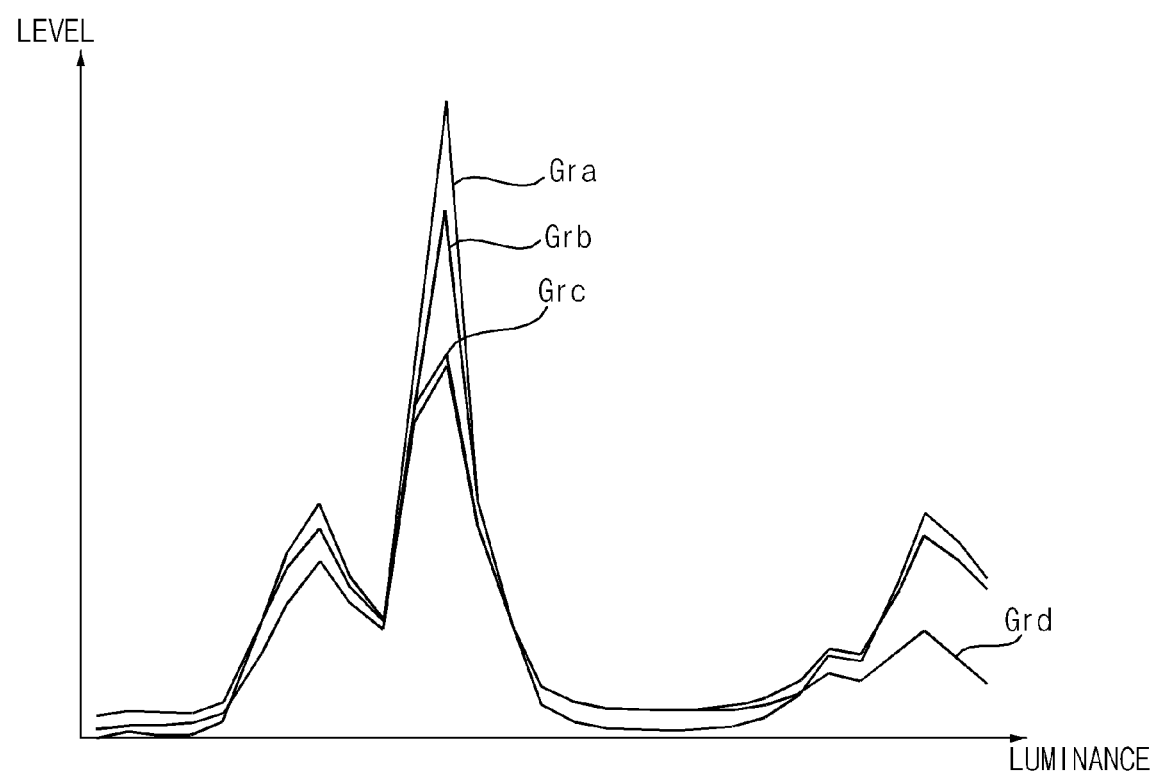

Curve Gra of FIG. 11B may be a gain curve corresponding to the luminance histogram HSm of FIG. 11A.

When a frequency of a luminance level is a peak, the largest gain may be taken, but when an excessively large gain is allocated, an entire image may be unnatural.

Accordingly, when a frequency of a luminance level is a peak, the luminance mapper 820 in the signal processing device 170 according to an embodiment of the present disclosure may stepwise perform gain adjustment processing for alleviating a gain.

Accordingly, the luminance mapper 820 in the signal processing device 170 may stepwise perform calculation of curve Gra, calculation of curve Grb, calculation of curve Grc, and calculation of curve Grd of FIG. 11B. Lastly, the luminance mapper 820 in the signal processing device 170 may perform luminance mapping based on curve Grd.

That is, the luminance mapper 820 in the signal processing device 170 may perform luminance mapping based on the frequency of the luminance histogram, in which case filtering may be performed stepwise on the peak of the frequency, and as a result, luminance mapping may be performed based on the lastly calculated luminance mapping curve or a luminance mapping table.

Accordingly, lastly, contrast based on an object may be improved, and low gray level expression for a background may be improved.

Figure 11C:
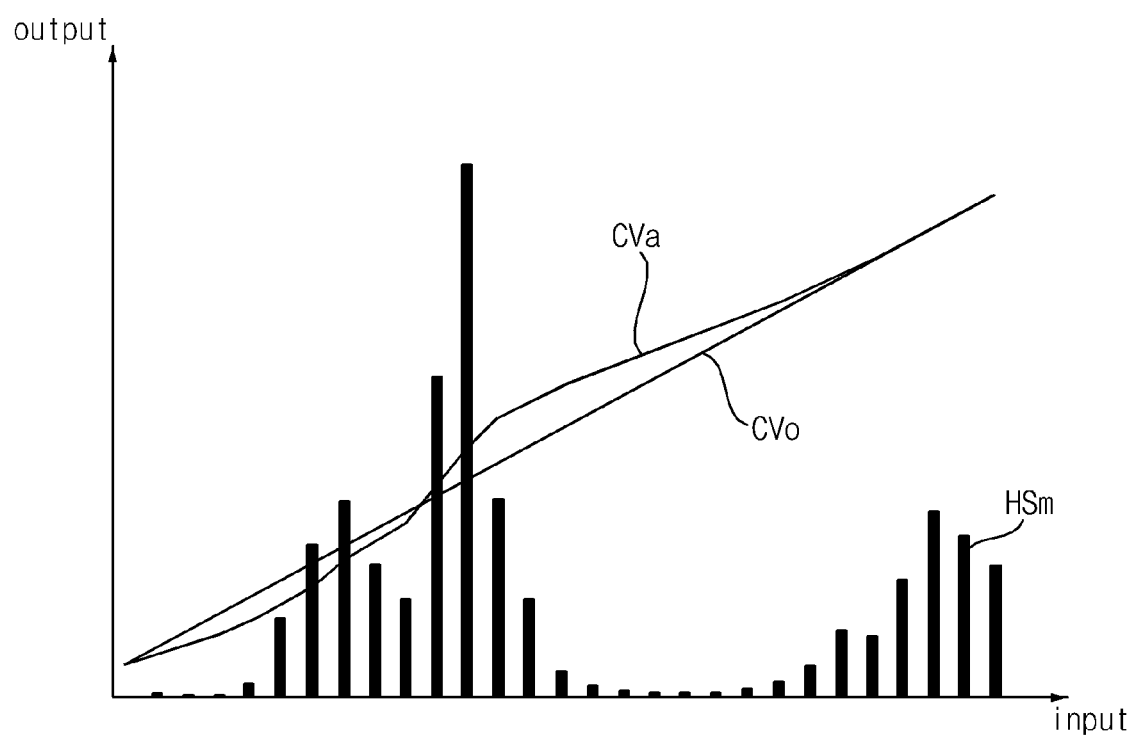

FIG. 11C is a diagram showing an example of a luminance mapping curve CVa based on curve Grd of FIG. 11B.

Referring to the drawing, in the luminance mapping curve CVa of FIG. 11C, a luminance conversion level may be further reduced in a low gray level region and may be further increased in a medium gray level region in which a frequency is peak, compared with a bypass curve CVo of FIG. 8A.

Accordingly, luminance expression may be improved in a region in which an object is disposed, and a low gray level expression may be improved in a region in which a background is disposed, and accordingly, contrast of an image displayed on the display 180 may be improved.

FIG. 12 is a diagram showing an example of the first luminance histogram Hsa indicating luminance distribution of the first input image 810 and the first input image 810 and the calculated first luminance mapping curve CVb1.

In the drawing, the luminance histogram Hsa may indicate a frequency depending on the luminance of the first input image 810.

Referring to the drawing, the first input image 810 may be an image including a face object region, and the face object region Arm may have a luminance level between luminance level Iz1 and luminance level Iz2 of the first luminance histogram Hsa.

Referring to the drawing, most of luminance levels of the first input image 810 may distribute to luminance level Iz2 from luminance level 0 and seldom distribute between luminance level Iz2 and the maximum luminance level.

Thus, according to the second curve CVy of FIG. 8B, when luminance mapping is performed, if the luminance level of the first input image 810 distributes to luminance level Iz2 from luminance level 0, a luminance adjustment level based on luminance mapping may not be sufficient, and if the luminance level of the first input image 810 distributes to the maximum luminance level from luminance level z2, it may be disadvantageous that a luminance adjustment level during luminance mapping is excessively converted.

Accordingly, the luminance mapper 820 in the signal processing device 170 according to an embodiment of the present disclosure may calculate the first luminance mapping curve CVb1 based on the first luminance histogram Hsa and may perform luminance mapping based on the calculated first luminance mapping curve CVb1.

According to the first luminance mapping curve CVb1, a luminance adjustment level, that is, an output level in the first luminance mapping curve CVb1 may always be greater than a luminance adjustment level of the bypass curve CVo.

That is, a luminance adjustment level in a first luminance mapping curve CVb1 between luminance level 0 and the maximum luminance level may always be greater than a luminance adjustment level of the bypass curve CVo.

Next, comparing the first luminance mapping curve CVb1 with the second curve CVy of FIG. 8B, a luminance adjustment level between luminance level 0 and luminance level Iz2 may approximately greater than a luminance adjustment level of the second curve CVy of FIG. 8B, and a luminance adjustment level between luminance level Iz2 and the maximum luminance level may be approximately less than the luminance adjustment level of the second curve CVy of FIG. 8B.

Accordingly, compared with the second curve CVy of FIG. 8B, a luminance adjustment level between luminance level Iz1 and luminance level Iz2 at which large luminance distribution is present is large, and accordingly, it may be possible to perform luminance adjustment or luminance mapping corresponding to an object of an input image.

As a result, contrast of an image displayed on the display 180 may be improved. In particular, contrast of a main object region Arm in the image may be improved.

FIG. 13 is a diagram showing an example of the second luminance histogram Hsb indicating luminance distribution of the second input image 860 and the second input image 860 and the calculated second luminance mapping curve CVb2.

In the drawing, the luminance histogram Hsa may indicate a frequency depending on the luminance of the second input image 860.

Referring to the drawing, the second input image 860 may be an image including the flower object region Ara and the background region Aub, the flower object region Ara may have a luminance level between luminance level Iz2 and the maximum luminance level (WHa) of the second luminance histogram Hsb, and the background region Aub may have a luminance level between luminance level 0 and luminance level Iz1 (WHb) of the second luminance histogram Hsb.

Referring to the drawing, most of luminance levels of the second input image 860 may distribute between luminance level Iz1 and luminance level 0 or between luminance level Iz2 and the maximum luminance level and seldom distribute between luminance level Iz1 and luminance level Iz2.

Thus, according to the second curve CVy of FIG. 8B, when luminance mapping is performed, if the luminance level of the second input image 860 distributes between luminance level 0 and luminance level Iz1 or between luminance level Iz2 and the maximum luminance level, a luminance adjustment level based on luminance mapping may not be sufficient, and if the luminance level of the second input image 860 distributes between luminance level Iz1 and luminance level Iz2, it may be disadvantageous that a luminance adjustment level during luminance mapping is excessively converted.

When the second input image 860 has the same average luminance level as that of the first input image 810 of FIG. 12, luminance mapping may be performed based on the same second curve CVy, and as described above, it may be disadvantageous that accurate luminance mapping is not performed for each object region.

Accordingly, the luminance mapper 820 in the signal processing device 170 according to an embodiment of the present disclosure may calculate the second luminance mapping curve CVb2 based on the second luminance histogram Hsb and may perform luminance mapping based on the calculated second luminance mapping curve CVb2.

According to the second luminance mapping curve CVb2, a luminance adjustment level, that is, an output level in the second luminance mapping curve CVb2 may always be greater than a luminance adjustment level of the bypass curve CVo.

That is, a luminance adjustment level in the second luminance mapping curve CVb2 between luminance level 0 and the maximum luminance level may always be greater than a luminance adjustment level of the bypass curve CVo.

Next, comparing the second luminance mapping curve CVb2 with the second curve CVy of FIG. 8B, a luminance adjustment level between luminance level 0 and luminance level Iz1 may approximately greater than a luminance adjustment level of the second curve CVy of FIG. 8B, and a luminance adjustment level between luminance level Iz1 and luminance level Iz2 may be approximately less than the luminance adjustment level of the second curve CVy of FIG. 8B.

Accordingly, luminance expression in a low gray level region (WHb) between a luminance level and luminance level Iz1 may be improved. Accordingly, contrast of a background region Arb in the image may be improved.

Comparing the second luminance mapping curve CVb2 and the second curve CVy of FIG. 8B, a luminance adjustment level between luminance level Iz2 and the maximum luminance level may be approximately less than a luminance adjustment level of the second curve CVy of FIG. 8B.

However, a luminance adjustment level between luminance level Iz and the maximum luminance level of the second luminance mapping curve CVb2 is greater than the bypass curve CVo, and accordingly, contrast of the main object region Ara in the image may be improved.

The average luminance level of the first input image 810 of FIG. 12 may be the same as the average luminance level of the second input image 860 of FIG. 13, and despite the same average luminance level, luminance mapping based on different luminance mapping curves may be performed depending on luminance distribution of each input image according to an embodiment of the present disclosure. Accordingly, it may be possible to perform adaptive luminance mapping to an input image, and as a result, dynamic contrast for each object may be achieved.

Figure 14:
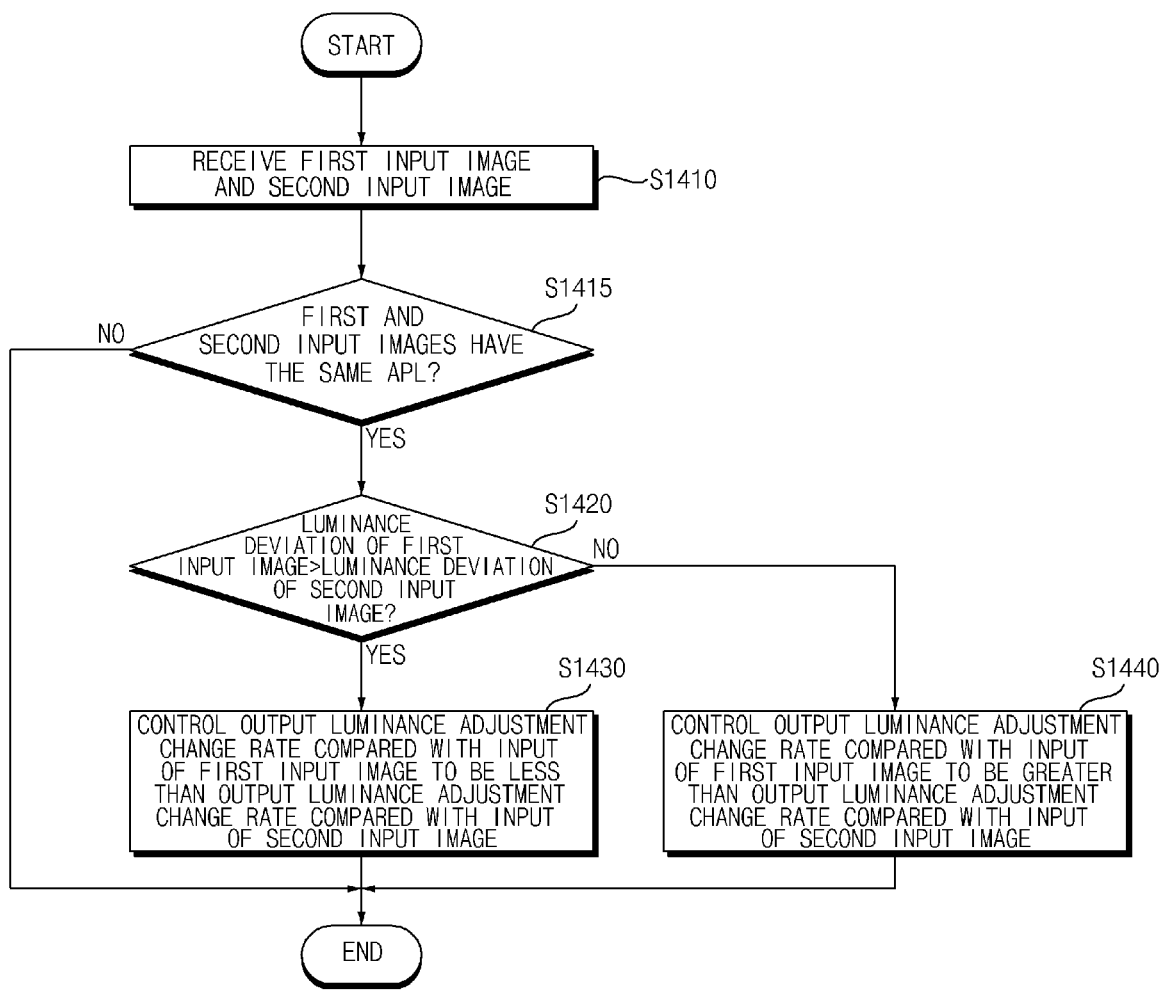
FIG. 14 is a flowchart showing a method of operating a signal processing device according to another embodiment of the present disclosure.
Figure 16:
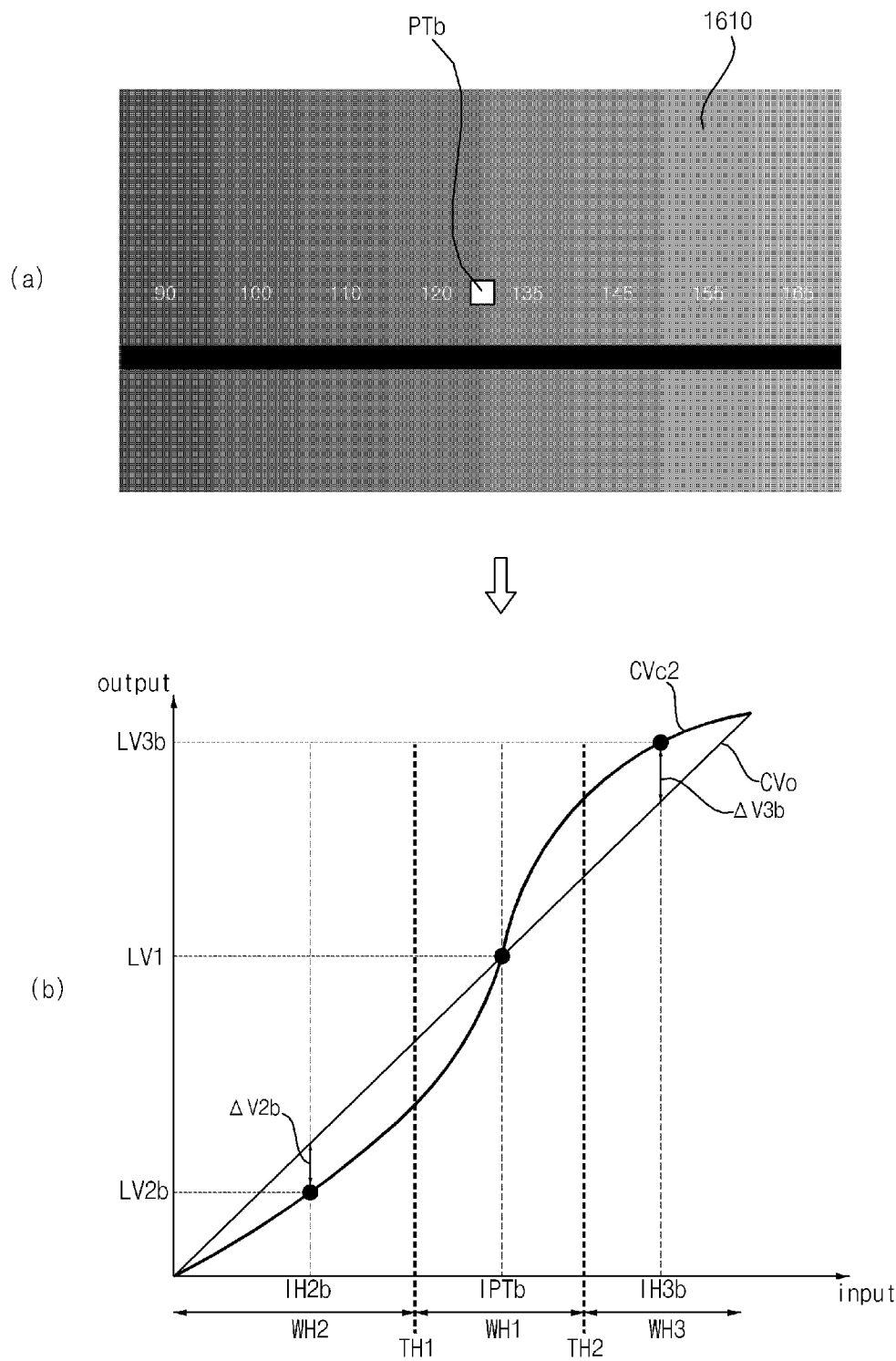

FIG. 14 is a flowchart showing a method of operating a signal processing device according to another embodiment of the present disclosure. FIGS. 15 to 16 are diagrams for explaining an operation of the signal processing device of FIG. 14.

Referring to the drawing, the image receiver 105 in the signal processing device 170 according to an embodiment of the present disclosure may receive an input image.

In particular, the image receiver 105 in the signal processing device 170 according to an embodiment of the present disclosure may receive the first input image 1510 and the second input image 1610 at different timings (S1410).

The image analyzer 610 in the signal processing device 170 may acquire luminance information of the input image.

Then, the image analyzer 610 in the signal processing device 170 may determine whether the first input image 1510 and the second input image 1610 have the same average luminance level (average picture level (APL)) (S1420), and when the first input image 1510 and the second input image 1610 have the same average luminance level, whether a luminance deviation of the first input image 1510 is greater than a luminance deviation of the second input image 1610 may be determined (S1420).

When the first input image 1510 and the second input image 1610 have the same average luminance level, the luminance mapper 820 in the signal processing device 170 may control the luminance adjustment change rates $\Delta V2a$ and $\Delta V3a$ of the first input image 1510 of FIG. 15 to be less than the luminance adjustment change rates $\Delta V2b$ and $\Delta V3b$ of the second input image 1610 of FIG. 16 (S1430).

In operation S1420, when a luminance deviation of the first input image 1510 is less than that of the second input image 1610, the luminance mapper 820 in the signal processing device 170 may perform control to increase the luminance adjustment change rates $\Delta V2a$ and $\Delta V3a$ of the first input image 1510 compared with the luminance adjustment change rates ΔV2b and ΔV3b of the second input image 1610 (S1440). That is, opposite setting to FIGS. 15 and 16 may be possible.

Comparing FIGS. 15 and 16, the luminance deviation of the first input image 1510 may be greater than that of the second input image 1610.

Luminance distribution of the first input image 1510 of FIG. 15 may be present to level 35 from level 20 approximately, and luminance distribution of the second input image 1610 of FIG. 16 may be present to level 165 from level 90 approximately.

In this case, the first input image 1510 and the second input image 1610 may have the same average luminance level, that is, level 127.

The luminance mapper 820 in the signal processing device 170 may perform luminance mapping based on a first luminance mapping curve CVc1 of FIG. 15.

In detail, the luminance mapper 820 in the signal processing device 170 may calculate a luminance histogram with respect to the first input image 1510, may calculate the first luminance mapping curve CVc1 based on the luminance histogram, and may perform luminance mapping based on the calculated first luminance mapping curve CVc1.

The luminance mapper 820 in the signal processing device 170 may perform luminance mapping based on a second luminance mapping curve CVc2.

In detail, the luminance mapper 820 in the signal processing device 170 may calculate a luminance histogram with respect to the second input image 1610, may calculate the second luminance mapping curve CVc2 based on the luminance histogram, and may perform luminance mapping based on the calculated second luminance mapping curve CVc2.

Comparing FIGS. 15 and 16, a luminance deviation of the first input image 1510 distributes to level 35 from level 20 approximately, and thus may be greater than that of the second input image 1610, luminance of which distributes to level 165 from level 90 approximately.

Accordingly, the luminance mapper 820 in the signal processing device 170 may set the first luminance mapping curve CVc1 to have a relatively small change rate, and that is, may set the first luminance mapping curve CVc1 to be close to the bypass curve CVo, and may set the second luminance mapping curve CVc2 to have a relatively great change rate, and that is, may set the second luminance mapping curve CVc2 to be further different from the bypass curve CVo.

That is, the first luminance mapping curve CVc1 may be formed smoother than the second luminance mapping curve CVc2.

The luminance mapper 820 in the signal processing device 170 may set a luminance adjustment level of the first luminance mapping curve CVc1 or the second luminance mapping curve CVc2 to be less than a luminance adjustment level of the bypass curve CVo with respect to a smaller luminance level than the average luminance level IPTa.

For example, with respect to a smaller luminance level of section WH2 of FIGS. 15 and 16 than the average luminance level IPTa, a luminance adjustment level of the first luminance mapping curve CVc1 or the second luminance mapping curve CVc2 may be set to be less than a luminance adjustment level in the bypass curve CVo.

The luminance mapper 820 in the signal processing device 170 may set a luminance adjustment level of the first luminance mapping curve CVc1 or the second luminance mapping curve CVc2 to be greater than a luminance adjustment level of the bypass curve CVo with respect to a greater luminance level than the average luminance level IPTa.

For example, with respect to a greater luminance level of section WH3 of FIGS. 15 and 16 than the average luminance level IPTa, a luminance adjustment level of the first luminance mapping curve CVc1 or the second luminance mapping curve CVc2 may be set to be greater than a luminance adjustment level of the bypass curve CVo.

The luminance mapper 820 in the signal processing device 170 may set a luminance adjustment level of the first luminance mapping curve CVc1 or the second luminance mapping curve CVc2 to LV1 that is the same as a luminance adjustment level of the bypass curve CVo with respect to the average luminance level IPTa.

A pattern PTa in the first input image 1510 of FIG. 15 may be a pattern having the average luminance level IPTa, and a mapped luminance adjustment level may be LV1 according to luminance mapping of the luminance mapper 820.

A pattern PTb in the second input image 1610 of FIG. 16 may be a pattern having the average luminance level IPTb, and a mapped luminance adjustment level may be LV1 according to luminance mapping of the luminance mapper 820.

In the state in which the first input image 1510 and the second input image 1610 have the same average luminance level, when a luminance deviation of the first input image 1510 is greater than that of the second input image 1610, the luminance mapper 820 in the signal processing device 170 may equalize the luminance adjustment level LV1 in the average luminance level IPTa of the first input image 1510 with the luminance adjustment level LV1 in the average luminance level IPTb of the second input image 1610. Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 may control the luminance adjustment change rate ΔV2a in the luminance level IH2a that is less than an average luminance level of the first input image 1510 to be less than the luminance adjustment change rate ΔV2b in the luminance level IH2b that is less than an average luminance level of the second input image 1610.

In the state in which the first input image 1510 and the second input image 1610 have the same average luminance level, when a luminance deviation of the first input image 1510 is greater than that of the second input image 1610, the luminance mapper 820 in the signal processing device 170 may control the luminance adjustment level LV2a in the luminance level IH2a that is less than the average luminance level of the first input image 1510 to be greater than the luminance adjustment level LV2b in the luminance level IH2b that is less than the average luminance level of the second input image 1610.

For example, luminance level 90 in the first input image 1510 of FIG. 15 may correspond to IH2a, and a mapped luminance adjustment level may be LV2a that is greater than LV2b according to luminance mapping of the luminance mapper 820, and a luminance adjustment change rate may be ΔV2a that is less than ΔV2b.

Luminance level 90 in the second input image 1610 of FIG. 16 may correspond to IH2b, and a mapped luminance adjustment level may be LV2b according to luminance mapping of the luminance mapper 820, and a luminance adjustment change rate may be ΔV2b.

Accordingly, contrast of an image displayed on the display 180 may be improved.

In the state in which the first input image 1510 and the second input image 1610 have the same average luminance level, when a luminance deviation of the first input image 1510 is greater than that of the second input image 1610, the luminance mapper 820 in the signal processing device 170 may control the luminance adjustment change rate $\Delta V3a$ in the luminance level IH3$a$ that is greater than the average luminance level of the first input image 1510 to be less than the luminance adjustment change rate $\Delta V3b$ in the luminance level IH3$b$ that is greater than the average luminance level of the second input image 1610.

In the state in which the first input image 1510 and the second input image 1610 have the same average luminance level, when a luminance deviation of the first input image 1510 is greater than that of the second input image 1610, the luminance mapper 820 in the signal processing device 170 may control the luminance adjustment level LV3$a$ in the luminance level IH2$b$ that is greater than the average luminance level of the first input image 1510 to be less than the luminance adjustment level LV3$b$ in the luminance level IH3$b$ that is greater than the average luminance level of the second input image 1610.

For example, luminance level 165 in the first input image 1510 of FIG. 15 may correspond to IH3$a$, a mapped luminance adjustment level may be LV2$a$ that is less than LV3$b$ according to luminance mapping of the luminance mapper 820, and a luminance adjustment change rate may be $\Delta V3a$ that is less than $\Delta V3b$.

A luminance level 165 in the second input image 1610 of FIG. 16 may correspond to IH3$b$, and a mapped luminance adjustment level may be LV3$b$ according to luminance mapping of the luminance mapper 820, and a luminance adjustment change rate may be $\Delta V3b$.

Accordingly, contrast of an image displayed on the display 180 may be improved.

The luminance mapper 820 in the signal processing device 170 may adjust the luminance of an input image based on luminance distribution of the input image, and may perform control to increase a variation of the adjusted luminance as a frequency of the luminance distribution of the input image is increased. Accordingly, contrast of an image displayed on the display 180 may be improved.

The signal processing device 170 may extract an object of the input image 810 or 860 and may perform control to increase a luminance variation of the extracted object Arm or Ara in response to the luminance of the extracted object Arm or Ara. Accordingly, contrast of an image displayed on the display 180 may be improved.

The luminance mapper 820 in the signal processing device 170 may perform control to increase a luminance variation of the extracted object Arm or Ara as a peak of luminance distribution of the extracted object Arm or Ara increases. Accordingly, contrast of an image displayed on the display 180 may be improved.

The luminance mapper 820 in the signal processing device 170 may perform control to increase a luminance variation of the extracted object Arm or Ara as a deviation of luminance distribution of the extracted object Arm or Ara decreases. Accordingly, contrast of an image displayed on the display 180 may be improved.

The signal processing device 170 may extract a background of an input image and may perform control to increase a luminance variation of the extracted object Arm or Ara in response to the luminance of the extracted background. Accordingly, contrast of an image displayed on the display 180 may be improved.

As a result, the signal processing device 170 and the image display apparatus 100 including the same according to various embodiments of the present disclosure may adaptively perform luminance mapping according to luminance distribution of an input image, thereby improving contrast of an image displayed on the display 180. In particular, contrast of a main object in the image may be improved.

An image display apparatus according to an embodiment of the present disclosure may include a display, an image receiver for receiving an input image, and a signal processing device for performing signal processing of the input image from the image receiver and outputting image data to the display, and when a luminance deviation of a first input image is greater than that of a second input image, the signal processing device may control a luminance adjustment change rate of a first input image to be less than a luminance adjustment change rate of a second input image. Accordingly, contrast of an image displayed on the display 180 may be improved. In particular, contrast of a main object in the image may be improved. In addition, contrast of a background in the image may be improved.

In the state in which the first input image and the second input image have the same average luminance level, when a luminance deviation of the first input image is less than that of the second input image, the signal processing device may control a luminance adjustment change rate of the first input image to be greater than that of the second input image. Accordingly, contrast of an image displayed on the display may be improved.

In the state in which the first input image and the second input image have the same average luminance level, when a luminance deviation of the first input image is greater than that of the second input image, the signal processing device may equalize a luminance adjustment level in an average luminance level of the first input image with a luminance adjustment level in an average luminance level of the second input image. Accordingly, contrast of an image displayed on the display may be improved.

In the state in which the first input image and the second input image have the same average luminance level, when a luminance deviation of the first input image is greater than that of the second input image, the signal processing device may control a luminance adjustment change rate in a luminance level that is less than an average luminance level of the first input image to be less than a luminance adjustment change rate in a luminance level that is less than an average luminance level of the second input image. Accordingly, contrast of an image displayed on the display may be improved.

In the state in which the first input image and the second input image have the same average luminance level, when a luminance deviation of the first input image is greater than that of the second input image, the signal processing device may control a luminance adjustment level in a luminance level that is less than the average luminance level of the first input image to be greater than a luminance adjustment level in a luminance level that is less than the average luminance level of the second input image. Accordingly, contrast of an image displayed on the display may be improved.

In the state in which the first input image and the second input image have the same average luminance level, when a luminance deviation of the first input image is greater than that of the second input image, the signal processing device may control a luminance adjustment change rate in a luminance level that is greater than the average luminance level of the first input image to be less than a luminance adjustment change rate in a luminance level that is greater than the average luminance level of the second input image. Accordingly, contrast of an image displayed on the display may be improved.

In the state in which the first input image and the second input image have the same average luminance level, when a luminance deviation of the first input image is greater than that of the second input image, the signal processing device may control a luminance adjustment level in a luminance level greater than the average luminance level of the first input image to be less than a luminance adjustment level in a luminance level that is greater than the average luminance level of the second input image. Accordingly, contrast of an image displayed on the display may be improved.

The signal processing device may adjust the luminance of an input image based on luminance distribution of the input image and may perform control to increase a variation of the adjusted luminance as a frequency of luminance distribution of the input image is increased. Accordingly, contrast of an image displayed on the display may be improved.

The signal processing device may extract an object of the input image and may perform control to increase a luminance variation of the extracted object in response to the luminance of the extracted object. Accordingly, contrast of an image displayed on the display may be improved.

The signal processing device may perform control to increase a luminance variation of the extracted object as a peak of luminance distribution of the extracted object increases. Accordingly, contrast of an image displayed on the display may be improved.

The signal processing device may perform control to increase a luminance variation of the extracted object as a deviation of luminance distribution of the extracted object decreases. Accordingly, contrast of an image displayed on the display may be improved.

The signal processing device may extract a background of an input image and may perform control to increase a luminance variation of the extracted object in response to the luminance of the extracted background. Accordingly, contrast of an image displayed on the display may be improved.

The signal processing device may include an image analyzer for analyzing an input image, and a luminance mapper for performing luminance mapping based on luminance information of the input image from the image analyzer. The luminance mapper may control a luminance adjustment change rate of the first input image to be less than a luminance adjustment change rate of the second input image when a luminance deviation of the first image is greater than that of the second input image in the state in which the first input image and the second input image have the same average luminance level. Accordingly, contrast of an image displayed on the display may be improved.

An image display apparatus according to another embodiment of the present disclosure may include a display, an image receiver for receiving an input image, and a signal processing device for performing signal processing of the input image from the image receiver and outputting image data to the display, and the signal processing device may adjust the luminance of an input image based on luminance distribution of the input image and may control to increase a variation of the adjusted luminance as a frequency of luminance distribution of an input image is increased. Accordingly, contrast of an image displayed on the display may be improved. In particular, contrast of a main object in the image may be improved. In addition, contrast of a background in the image may be improved. Accordingly, contrast of an image displayed on the display may be improved.

The signal processing device may extract an object of the input image and may perform control to increase a luminance variation of the extracted object as a peak of luminance distribution of the extracted object increases. Accordingly, contrast of an image displayed on the display may be improved.

The signal processing device may extract an object of an input image and may perform control to increase a luminance variation of the extracted object as a deviation of luminance distribution of the extracted object decreases. Accordingly, contrast of an image displayed on the display may be improved.

The signal processing device according to an embodiment of the present disclosure may include an image analyzer for analyzing an input image, and a luminance mapper for performing luminance mapping based on luminance information of the input image from the image analyzer. The luminance mapper may control a luminance adjustment change rate of the first input image to be less than a luminance adjustment change rate of the second input image when a luminance deviation of the first input image is greater than that of the second input image. Accordingly, contrast of an image displayed on the display may be improved. In particular, contrast of a main object in the image may be improved. In addition, contrast of a background in the image may be improved. Accordingly, contrast of an image displayed on the display may be improved. In particular, contrast of a main object in the image may be improved. In addition, contrast of a background in the image may be improved.

In the state in which the first input image and the second input image have the same average luminance level, when a luminance deviation of the first input image is greater than that of the second input image, the luminance mapper may control a luminance adjustment change rate in a luminance level that is less than the average luminance level of the first input image to be less than a luminance adjustment change rate in a luminance level that is less than the average luminance level of the second input image, and may control a luminance adjustment level in a luminance level that is less than the average luminance level of the first input image to be greater than a luminance adjustment level in a luminance level that is less than the average luminance level of the second input image. Accordingly, contrast of an image displayed on the display may be improved.

In the state in which the first input image and the second input image have the same average luminance level, when a luminance deviation of the first input image is greater than that of the second input image, the luminance mapper may control a luminance adjustment change rate in a luminance level that is greater than the average luminance level of the first input image to be less than a luminance adjustment change rate in a luminance level that is greater than the average luminance level of the second input image, and may control a luminance adjustment level in a luminance level that is greater than the average luminance level of the first input image to be less than a luminance adjustment level in a luminance level that is greater than the average luminance level of the second input image. Accordingly, contrast of an image displayed on the display may be improved.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An image display apparatus comprising:
   a display;
   an image receiver configured to receive a first input image and a second input image; and
   a signal processing device configured to:
   determine whether the first input image and the second input image have substantially a same average luminance level;
   control a luminance adjustment change rate of the first input image to be greater than a luminance adjustment change rate of the second input image, based on a luminance deviation between a lowest luminance level and a highest luminance level of the first input image being less than a luminance deviation between a lowest luminance level and a highest luminance level of the second input image, and based on the determine that the first input image and the second input image have the substantially the same average luminance level;
   control the luminance adjustment change rate of the first input image to be less than the luminance adjustment change rate of the second input image, based on the luminance deviation between the lowest luminance level and the highest luminance level of the first input image being greater than the luminance deviation between the lowest luminance level and the highest luminance level of the second input image, and based on the determine that the first input image and the second input image have the substantially the same average luminance level; and
   cause the display to display the first input image and the second input image.

2. The image display apparatus of claim 1, wherein the signal processing device is further configured to equalize a luminance adjustment level in an average luminance level of the displayed first input image with a luminance adjustment level in an average luminance level of the displayed second input image based on the luminance deviation of the displayed first input image being greater than the luminance deviation of the displayed second input image, and based on the determine that the displayed first input image and the displayed second input image have the substantially the same average luminance level.

3. The image display apparatus of claim 1, wherein the signal processing device is further configured to control the luminance adjustment change rate of the first input image in a luminance level less than the average luminance level of the displayed first input image to be less than the luminance adjustment change rate of the second input image in a luminance level less than the average luminance level of the displayed second input image, based on the luminance deviation of the displayed first input image being greater than the luminance deviation of the displayed second input image, and based on the determine that the displayed first input image and the displayed second input image have the substantially the same average luminance level.

4. The image display apparatus of claim 1, wherein the signal processing device is further configured to control the luminance adjustment level of the first input image in a luminance level less than the average luminance level of the displayed first input image to be less than the luminance adjustment level of the second input image in a luminance level less than the average luminance level of the displayed second input image, based on the luminance deviation of the displayed first input image being greater than the luminance deviation of the displayed second input image, and based on the determine that the displayed first input image and the displayed second input image have the substantially the same average luminance level.

5. The image display apparatus of claim 1, wherein the signal processing device is further configured to control the luminance adjustment change rate of the first input image in a luminance level greater than the average luminance level of the displayed first input image to be less than the luminance adjustment change rate of the second input image in a luminance level greater than the average luminance level of the displayed second input image, based on the luminance deviation of the displayed first input image being greater than the luminance deviation of the displayed second input image, and based on the determine that the displayed first input image and the displayed second input image have the substantially the same average luminance level.

6. The image display apparatus of claim 1, wherein the signal processing device is further configured to control the luminance adjustment level of the first input image in a luminance level greater than the average luminance level of the displayed first input image to be less than the luminance adjustment level in a luminance level greater than the average luminance level of the displayed second input image, based on the luminance deviation of the displayed first input image being greater than the luminance deviation of the displayed second input image, and based on the determine that the displayed first input image and the displayed second input image have the substantially the same average luminance level.

7. The image display apparatus of claim 1, wherein the signal processing device is further configured to adjust a luminance of the displayed first input image based on a luminance distribution of the displayed first input image and to increase a variation of the adjusted luminance as a frequency of the luminance distribution of the displayed first input image increases.

8. The image display apparatus of claim 1, wherein the signal processing device is further configured to extract an object of the displayed first input image or the displayed second input image and to increase a luminance variation of the extracted object in response to a luminance of the extracted object.

9. The image display apparatus of claim 8, wherein the luminance variation of the extracted object increases as a peak of luminance distribution of the extracted object increases.

10. The image display apparatus of claim 8, wherein the luminance variation of the extracted object increases as a deviation of luminance distribution of the extracted object decreases.

11. The image display apparatus of claim 1, wherein the signal processing device is further configured to extract a background of the displayed first input image or the displayed second input image and to increase a luminance variation of an extracted object in response to a luminance of the extracted background.

12. The image display apparatus of claim 1, wherein the signal processing device comprises:
    an image analyzer configured to analyze the first input image and the second input image; and
    a luminance mapper configured to perform luminance mapping based on luminance information of the analyzed first input image and the analyzed second input image from the image analyzer, and wherein the luminance mapper is further configured to control the luminance adjustment change rate of the displayed first input image to be less than the luminance adjustment change rate of the displayed second input image, based on the luminance deviation of the displayed first input image being greater than the luminance deviation of the displayed second input image, and based on the determine that the displayed first input image and the displayed second input image have the substantially the same average luminance level.

13. A signal processing device comprising:
an image analyzer configured to analyze a first input image and a second input image; and
a luminance mapper configured to:
perform luminance mapping based on luminance information of the first and second input images from the image analyzer;
control a luminance adjustment change rate of the first input image to be greater than a luminance adjustment change rate of the second input image, based on a luminance deviation between a lowest luminance level and a highest luminance level of the first input image being less than a luminance deviation between a lowest luminance level and a highest luminance level of the second input image, and based on the first input image and the second input image having substantially a same average luminance level;
control the luminance adjustment change rate of the first input image to be less than the luminance adjustment change rate of the second input image, based on the luminance deviation between the lowest luminance level and the highest luminance level of the first input image being greater than the luminance deviation between the lowest luminance level and the highest luminance level of the second input image, and based on the first input image and the second input image having the substantially the same average luminance level.

14. The signal processing device of claim 13, wherein the luminance mapper is further configured to control the luminance adjustment change rate of the first input image in a luminance level less than the average luminance level of the first input image to be less than the luminance adjustment change rate of the second input image in a luminance level less than the average luminance level of the second input image, based on the luminance deviation of the first input image being greater than the luminance deviation of the second input image, and based on the first input image and the second input image having the substantially the same average luminance level, and to control a luminance adjustment level of the first input image in a luminance level less than the average luminance level of the first input image to be greater than the luminance adjustment level of the second input image in a luminance level less than the average luminance level of the second input image.

15. The signal processing device of claim 13, wherein the luminance mapper is configured to control the luminance adjustment change rate of the first input image in a luminance level greater than the average luminance level of the first input image to be less than the luminance adjustment change rate of the second input image in a luminance level greater than the average luminance level of the second input image, based on the luminance deviation of the first input image being greater than the luminance deviation of the second input image, and based on the first input image and the second input image having the substantially the same average luminance level, and to control a luminance adjustment level of the first input image in a luminance level greater than the average luminance level of the first input image to be less than the luminance adjustment level in a luminance level greater than the average luminance level of the second input image.

* * * * *